(12) United States Patent
Oh

(10) Patent No.: US 8,325,129 B2
(45) Date of Patent: Dec. 4, 2012

(54) LIQUID CRYSTAL DISPLAY AND DRIVING METHOD THEREOF

(75) Inventor: Dong Kyoung Oh, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1069 days.

(21) Appl. No.: 11/878,391

(22) Filed: Jul. 24, 2007

(65) Prior Publication Data

US 2008/0042968 A1  Feb. 21, 2008

(30) Foreign Application Priority Data

Aug. 21, 2006 (KR) .................. 10-2006-0078858

(51) Int. Cl.
G09G 3/36 (2006.01)
(52) U.S. Cl. .......... 345/102; 345/87; 345/204; 345/690; 323/299; 323/303; 323/349; 323/350; 323/351; 327/405; 327/407; 327/544

(58) Field of Classification Search ............ 345/87–104, 345/204–215, 690–699; 349/61–70; 62/561
See application file for complete search history.

(56) References Cited

U.S. PATENT DOCUMENTS

2002/0067332 A1* 6/2002 Hirakata et al. ............... 345/102
2004/0114396 A1* 6/2004 Kobayashi et al. ........... 362/561
2005/0104839 A1* 5/2005 Baik ............................. 345/102

* cited by examiner

Primary Examiner — Kevin M Nguyen
Assistant Examiner — Cory Almeida
(74) Attorney, Agent, or Firm — Morgan, Lewis & Bockius LLP

(57) ABSTRACT

A liquid crystal display device includes a back light assembly that emits light on a liquid crystal panel; and an inverter that controls brightness of the light emitted from the back light assembly according to a difference between video data of at least three frames that are sequentially inputted to the liquid crystal panel.

23 Claims, 16 Drawing Sheets

FIG. 3
RELATED ART
(a)
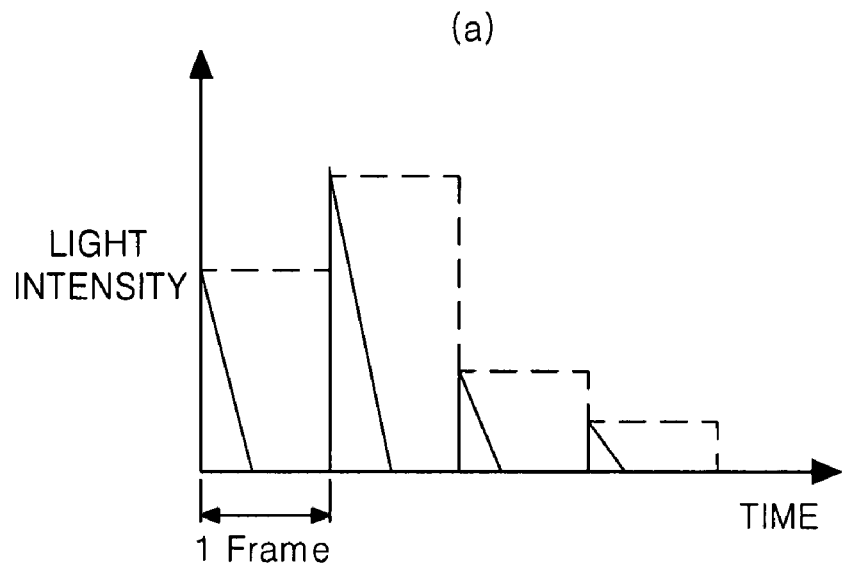
(b)
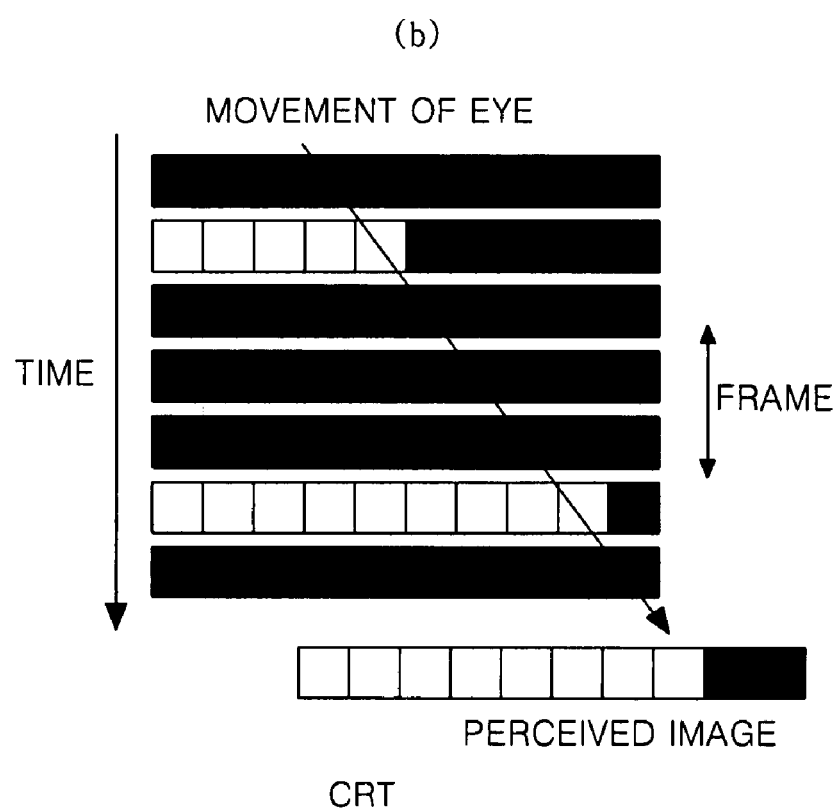
CRT

FIG. 4
RELATED ART
(a)
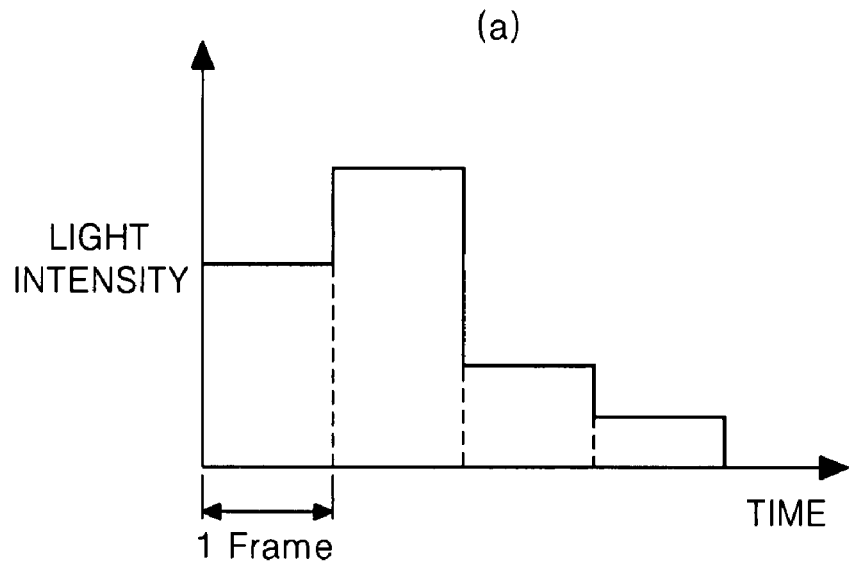
(b)
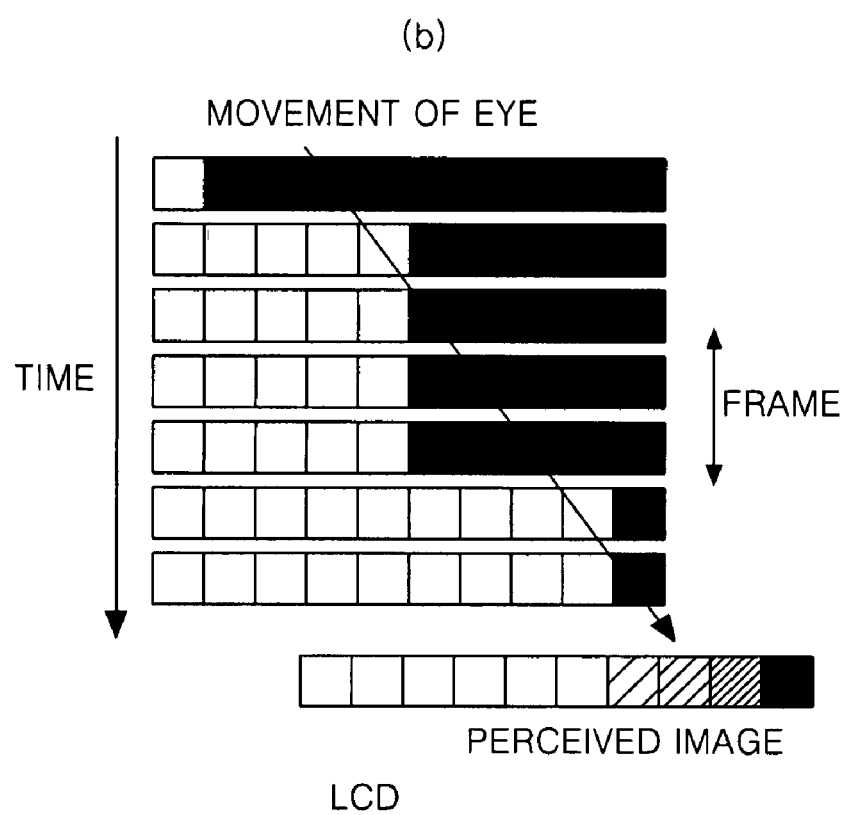

FIG. 16
(a)
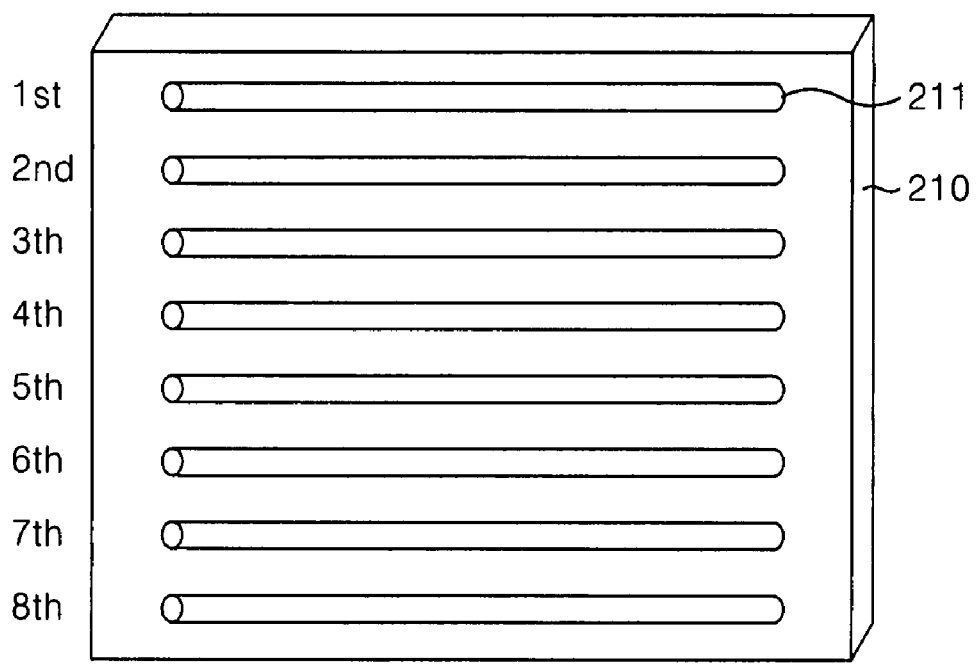
(b)
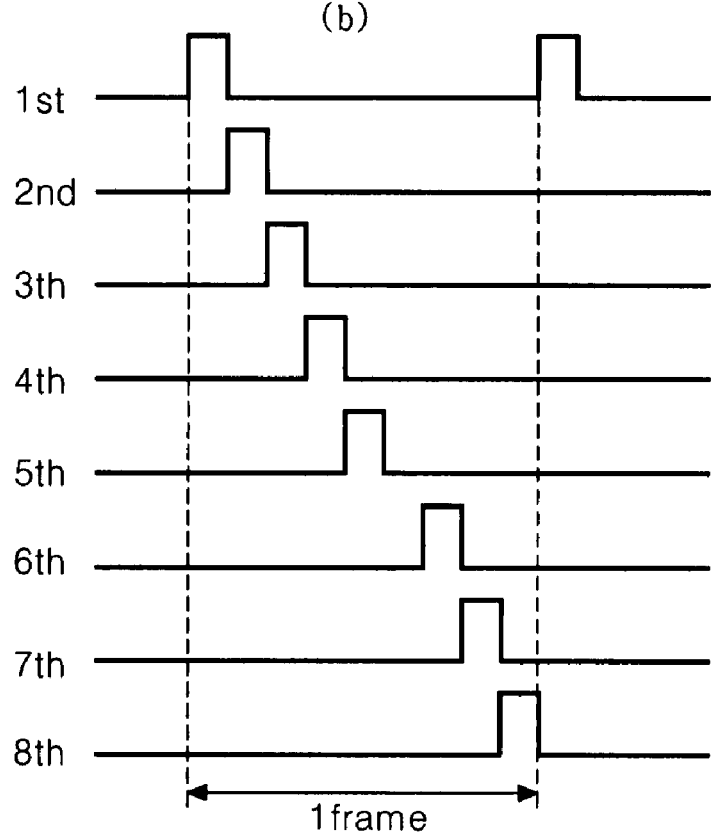

LIQUID CRYSTAL DISPLAY AND DRIVING METHOD THEREOF

This application claims the benefit of the Korean Patent Application No. 10-2006-078858 filed on Aug. 21, 2006, which is hereby incorporated by reference in its entirety.

BACKGROUND OF THE INVENTION

1. Field of the Invention

Embodiments of the present invention relate to a liquid crystal display (LCD device) device and a driving method thereof.

2. Discussion of the Related Art

Generally, an LCD device controls the light transmittance of liquid crystal molecules according to video signals to display a picture on a liquid crystal panel. The liquid crystal panel includes liquid crystal cells arranged in a matrix. In an active matrix type liquid crystal display, a switching device is provided in each of the liquid crystal cells. As the active matrix type LCD device can actively control the switching device in each cell, it has an advantage in displaying motion pictures. For a switching device of the active matrix type liquid crystal display, a thin film transistor (hereinafter TFT) may be employed, as shown in FIG. 1

FIG. 1 shows an equivalent circuit diagram for a pixel formed in an LCD device according to the related art. As shown in FIG. 1, in a pixel of an active matrix type liquid crystal device, a gate line GL is formed to cross a data line DL, and a thin film transistor TFT for driving a liquid crystal cell Clc is formed at the crossing of the gate line GL and the data line DL. The active matrix type LCD device changes digital input video data into an analog data voltage based on a gamma reference voltage. Then, the active matrix type LCD device supplies the analog data voltage to the data line DL and, at the same time, supplies a scan pulse to the gate line GL thereby charging the liquid crystal cell Clc.

A gate electrode of the TFT is connected to the gate line GL. A source electrode of the TFT is connected to the data line DL. A drain electrode of the TFT is commonly connected to a pixel electrode and a storage capacitor Cst of the liquid crystal cell Clc. A common voltage Vcom is supplied to a common electrode in the liquid crystal cell Clc. The storage capacitor Cst is charged by the data voltage supplied from the data line DL when the TFT is turned on, thereby maintaining a voltage in the liquid crystal cell Clc in a certain level.

The TFT is turned on by a scan pulse applied to the gate line GL to form a channel between the source electrode and the drain electrode of the TFT and provides a voltage on the data line DL to the pixel electrode of the liquid crystal cell Clc. When the voltage on the data line DL is provided to the pixel electrode, liquid crystal molecules of the liquid crystal cell Clc change their arrangement, thereby modulating an incident light.

FIG. 2 shows a schematic description of an active matrix type LCD device according to the related art. Referring to FIG. 2, an active type LCD device includes an LCD device panel 110 where a plurality of data lines DL1 to DLm (m is a positive integer) and a plurality of gate lines GL1 to GLn (n is a positive integer) cross each other to define a plurality of pixel areas, liquid crystal cells Clc formed in each of the pixel areas, and thin film transistors TFTs formed at each of the crossings between the data lines DL1 to DLm and the gate lines GL1 to GLn to drive liquid crystal cells Clc, a data driver 120 to supply video data to the data lines DL1 to DLm of the LCD device panel 110, a gate driver 130 to supply scan signals to the gate lines GL1 to GLn of the LCD device panel 110, a gamma reference voltage generator 140 to generate gamma reference voltages and supplies them to the data driver 120, a backlight assembly 150 to emit light into LCD device panel 110, an inverter 160 to supply an AC voltage and current to the backlight assembly 150, a common voltage generator 170 to generate a common voltage and to supply it to a common electrode of the liquid crystal cell Clc, a gate driving voltage generator 180 to generate a gate high voltage VGH and a gate low voltage VGL and to supply them to the gate driver 130, and a timing controller 190 to control the data driver 120 and the gate driver 130.

In the liquid crystal panel 110, liquid crystal molecules are injected between two glass substrates. Data lines DL1 to DLm and gate lines GL1 to GLn are formed to perpendicularly cross each other on a lower substrate of the liquid crystal panel 110. TFTs are formed at the crossings of the data lines DL1 to DLm and the gate lines GL1 to GLn. The TFTs transfer video data from the data lines DL1 to DLm to the liquid crystal cells Clc in response to scan pulses. Gate electrodes of the TFTs are connected to the gate lines GL1 to GLn. Source electrodes of the TFTs are connected to the data lines DL1 to DLm. Drain electrodes of the TFTs are connected to pixel electrodes and storage capacitors in liquid crystal cells Clc.

A TFT is turned on in response to a scan pulse supplied to a gate line that is connected to its gate electrode among the gate lines GL1 to GLn. When the TFT is turned on, it transfers video data from one of the data lines DL1 to DLm, which is connected to its drain electrode among the data lines DL1 to DLm, to a pixel electrode in a liquid crystal cell Clc.

The data driver 120 supplies video data to the data lines DL1 to DLm in response to a data driving control signal DDC provided from the timing controller 190. More specifically, the data driver 120 samples and latches RGB digital video data provided from the timing controller 190 and changes the RGB digital video data into analog data voltages for representing a gray level in each of the liquid crystal cell Clc based on a gamma reference voltage provided from the gamma reference voltage generator 140.

The gate driver 130 generates scan pulses in response to a gate driving control signal GDC and a gate shift clock GSC provided from the timing controller 190 and sequentially supplies the scan pulses to the gate lines GL1 to GLn. The gate driver 130 determines a high level voltage and a low level voltage of each scan pulse in accordance with a gate high voltage VGH and a gate low voltage VGL provided by the timing controller 190, respectively.

The gamma reference voltage generator 140 generates positive gamma reference voltages and negative gamma reference voltages by using a high-state source voltage VDD supplied into it and outputs them to the data driver 120.

The backlight assembly 150 is disposed on the rear surface of the liquid crystal panel 110. The backlight assembly 150 emits light by using an AC voltage and current provided from the inverter 160 and supplies the light into each pixel of the liquid crystal panel 110.

The inverter 160 changes a square wave signal that is generated inside it into a chopping wave signal and compares the chopping wave signal with a DC source voltage provided from a system (not shown), then generates a burst dimming signal that is proportion to the comparison result. If the burst dimming signal is generated in response to the square wave signal inside the inverter 160, a driving integrated circuit within the inverter 160 controls generating an AC voltage and current that is supplied to the backlight assembly 150 according to the burst dimming signal.

The common voltage generator 170 generates a common voltage Vcom by using a high-state source voltage VDD provided into it and supplies the common voltage Vcom to a common electrode of a liquid crystal cell Clc formed in each pixel of the liquid crystal panel 110.

The gate driving voltage generator 180 generates a gate high voltage VGH and a gate low voltage VGL by using a high-state source voltage VDD provided into it and supplies them to the gate driver 130. The gate high voltage VGH is greater than or at least equal to a threshold voltage of a TFT formed in each pixel and the gate low voltages VGL is less than the threshold voltage of a TFT. The gate high voltage VGH and the gate low voltage VGL are used to decide a high level voltage and a low level voltage of a scan pulse generated by the gate driver 130, respectively.

The timing controller 190 receives RGB digital video data provided from a scaler (not shown) formed in a system such as a television receiver and a monitor for a personal computer, etc. and supplies the RGB digital video data the data driver 120. The timing controller 190 generates a data driving control signal DDC and a gate driving control signal GDC by using horizon/vertical synchronizing signals H and V according to a clock signal CLK, then, supplies the data driving control signal DDC and the gate driving control signal GDC to the data driver 120 and the gate driver 130, respectively. The data driving control signal DDC includes a source shift clock SSC, a source start pulse SSP, a polarization control signal POL and a source output enable signal SOE, etc. The gate driving control signal GDC includes a gate start pulse GSP and a gate output enable signal GOE, etc.

However, because the LCD device is a hold type display device, a motion blurring phenomenon is displayed on a screen. This motion blurring phenomenon causes a motion picture to be blurred on the LCD display. This motion blurring phenomenon will be explained in conjunction with FIGS. 3 and 4, which represent a data characteristic of an LCD device and a cathode ray tube CRT.

In contrast, the CRT, as shown in FIG. 3 (a), is an impulse type display device that displays data by making a phosphorus emit light for a very short time in an early stage of one frame period and where most of the one frame period remains as a pause interval. Accordingly, in the CRT, a sharper image is perceived, as shown in FIG. 3 (b).

In a liquid crystal display, as shown in FIG. 4 (a), video data is supplied to a liquid crystal cell for a scanning period when a scan high voltage is supplied and the video data supplied to the liquid crystal cell is maintained in a non-scanning period that takes most of one frame period. Accordingly, the display picture is blurred in the liquid crystal display, as shown in FIG. 4 (b), because of a motion blurring phenomenon. The perceived image results from an integration effect of the image which temporarily lasts in an eye that follows a movement. Accordingly, even though the response speed of the LCD device is fast, an observer sees a blurred screen where a residual image of previous frames is displayed in a current frame, because of discordance between the movement of the eye and the static image of each frame. The motion blurring phenomenon deteriorates picture quality of an image displayed in a liquid crystal display.

SUMMARY OF THE INVENTION

Accordingly, embodiments of the present invention are directed to a liquid crystal display device and a method of driving the same that substantially obviate one or more problems due to limitations and disadvantages of the related art.

An object is to provide an LCD device and a driving method thereof capable of preventing a motion blurring phenomenon for a displayed image.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes a back light assembly that emits light on the liquid crystal panel; and an inverter that controls brightness of the light emitted from the back light assembly according to a difference between video data of at least three frames that are sequentially inputted to the liquid crystal panel.

In another aspect, a back light driving device for a liquid crystal display includes a duty ratio controller that controls a duty ratio of a driving control signal used for controlling the brightness of a back light assembly according to the difference between video data of at least three frames that are sequentially inputted to a liquid crystal panel; and an inverter that supplies a back light driving signal to the back light assembly to change the brightness of the light emitted from the back light assembly according to the duty ratio of the driving control signal.

In another aspect, a method of driving a liquid crystal display device includes comparing video data between at least three frames that are sequentially inputted to a liquid crystal panel; and controlling brightness of light emitted from a back light assembly according to a difference between video data of the at least three frames that are sequentially inputted to the liquid crystal panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 is a diagram representing a light emission characteristic of a cathode ray tube and a perceived image of a cathode ray tube that an observer perceives;

FIG. 4 is a diagram representing a light emission characteristic of an LCD device and a perceived image of an LCD device that an observer perceives;

FIG. 16 is a diagram illustrating an exemplary backlight assembly having a plurality of lamps and an exemplary driving signal to sequentially drive the plurality of lamps according to an embodiment of the present invention.

DETAILED DESCRIPTION OF EXEMPLARY EMBODIMENTS

Reference will now be made in detail to the exemplary embodiments of the present invention, which are illustrated in the accompanying drawings.

Figure 5:
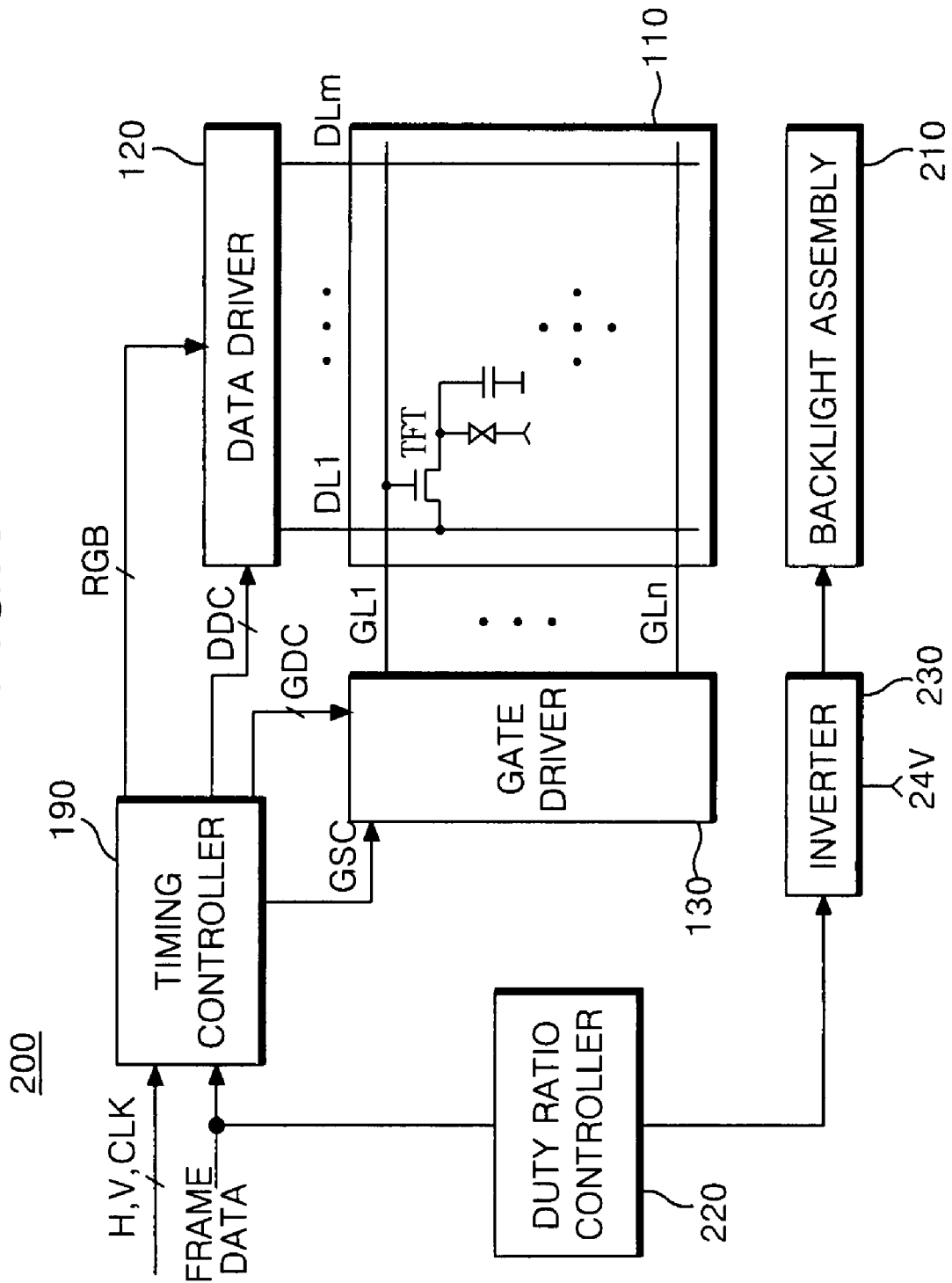
FIG. 5 shows a schematic diagram of an LCD device according to an embodiment of the present invention.

FIG. 5 shows a schematic diagram of an LCD device according to an embodiment of the present invention. Referring to FIG. 5, an LCD device 200 includes a gamma reference voltage generator 140, a common voltage generator 170 and a gate driving voltage generator 170, which are described in reference to FIG. 2, but are omitted in FIG. 5 to simplify the detailed explanation of this embodiment.

Figure 1:
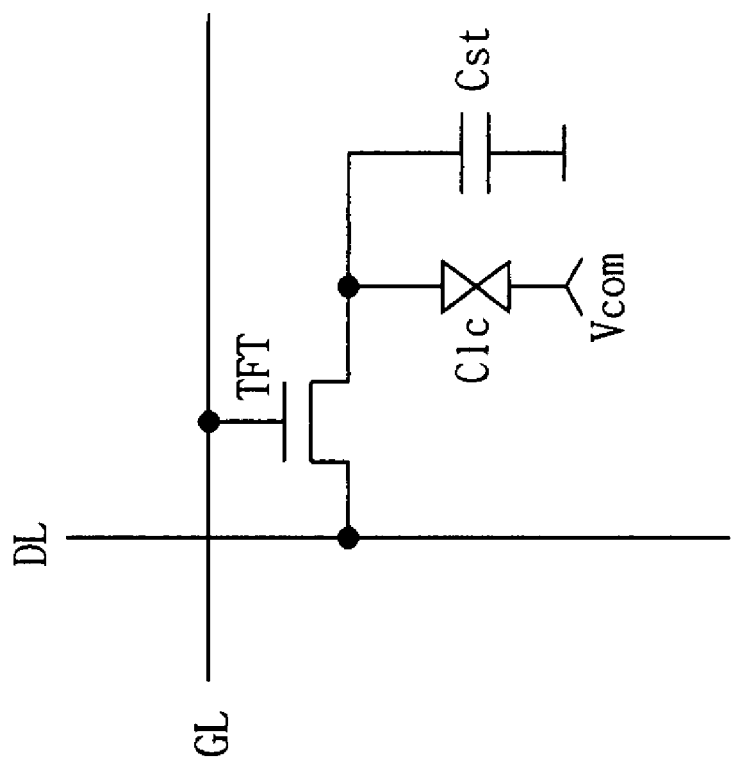
FIG. 1 shows an equivalent circuit diagram for a pixel formed in an LCD device according to the related art.
Figure 2:
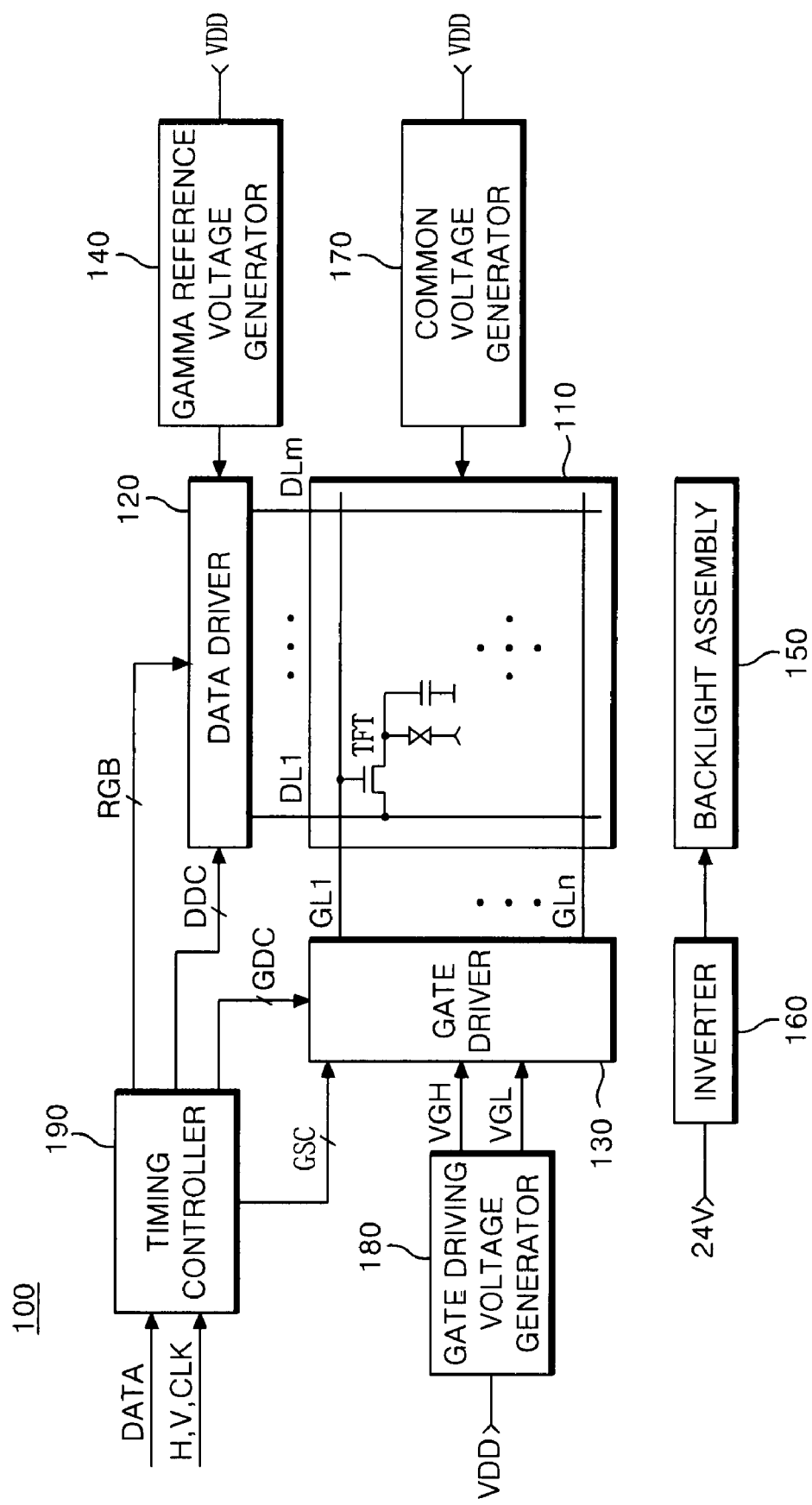
FIG. 2 shows a schematic description of an active matrix type LCD device according to the related art.

As shown in FIG. 5, the LCD device 200 includes a data driver 120, a gate driver 120 and a timing controller 190, similar to a related art LCD device shown in FIG. 2. Also, the LCD device 200 includes a backlight assembly 210 to emit light to a liquid crystal panel 110, a duty ratio controller 220 to control a duty ratio of a pulse width modulation (PWM) signal according to an amount of movement of an image displayed on the liquid crystal panel 110 where the pulse width modulation signal is used in controlling the brightness of the backlight assembly 210, and an inverter 230 to change the duty ratio of the pulse width modulation signal in response to the duty ratio controlled by the duty ratio controller 220 and to supply a backlight driving signal, i.e. a lamp driving voltage and current to the backlight assembly 210 where the backlight driving signal changes according to the duty ratio of the pulse width modulation signal.

The backlight assembly 210 is disposed on the rear surface of the liquid crystal panel 110 and includes a plurality of lamps (not shown) for controlling brightness of a screen. The lamps are turned on by a lamp driving current supplied from the inverter 230 and emit light. The brightness of the lamps changes according to the lamp driving current. In other words, the brightness of the lamps increases as the lamp driving current increases. Also, the brightness of the lamps decreases as the lamp driving current decreases. In addition, the backlight assembly 210 may be implemented by a plurality of light emitting diodes LEDs (not shown) or it may be implemented in a hybrid type including both a plurality of lamps and a plurality of LEDs.

The duty ratio controller 220 changes a duty ratio of a pulse width modulation signal generated in the inverter 230 according to an amount of movement of an image displayed by video data inputted from a system (not shown). The duty ratio controller 220 is connected to the system (not shown) or to the timing controller 190 to receive video data sequentially inputted during a plurality of frames. Herein, the video data inputted during one frame period (i.e. 16.67 ms in NTSC) is defined as frame data. The duty ratio controller 220 compares the video data sequentially inputted during the plurality of frame and determines whether an image displayed on a screen is a still picture or a motion picture based on the comparison result. In addition, the duty ratio controller 220 can classify the motion picture into different levels depending on an amount of movement of an image displayed on a screen. The amount of movement of an image may be decided according to the quantity of change of video data during a plurality of frames. For example, if the quantity of change of video data during a plurality of frames increases, it represents that the amount of movement of an image displayed on a screen is increasing. On the contrary, if the quantity of change of video data sequentially inputted during a plurality of frames decreases, it represents that the amount of movement of an image displayed on a screen is decreasing. Then, the duty ratio controller 220 changes the brightness of the lamps according to the amount of movement of an image displayed on a screen.

The inverter 230 changes a square wave signal generated inside itself into a chopping signal and compares the chopping signal with a DC source voltage provided from a system (not shown). Then, the inverter 160 generates a burst dimming signal according to the comparison result between the chopping signal and the DC source voltage provided from a system (not shown). If the burst dimming signal is generated, the inverter 160 generates a pulse width modulation signal that controls the size of a backlight driving signal, i.e. a driving AC voltage and current, according to the burst dimming signal, then, supplies the backlight driving signal to the backlight assembly 210. Also, the inverter 230 may be controlled by the timing controller 190. Especially, in a scanning backlight driving method where a plurality of lamps are arranged in parallel with each other and sequentially turned on and off in accordance with a scanning order of gate lines GL1 to GLn of the liquid crystal panel 110, a gate start pulse GSP indicating a scanning initiation time for the gate lines GL1 to GLn is supplied to the inverter 230 from the timing controller 190 to synchronize the scanning time of the plurality of lamps with that of the gate lines GL1 to GLn.

If the inverter 230 receives a duty ratio control signal together with a calculated duty ratio from the duty ratio controller 220, it can change the duty ratio of the pulse width modulation signal so that the pulse width modulation signal gets the calculated duty ratio.

Figure 6:
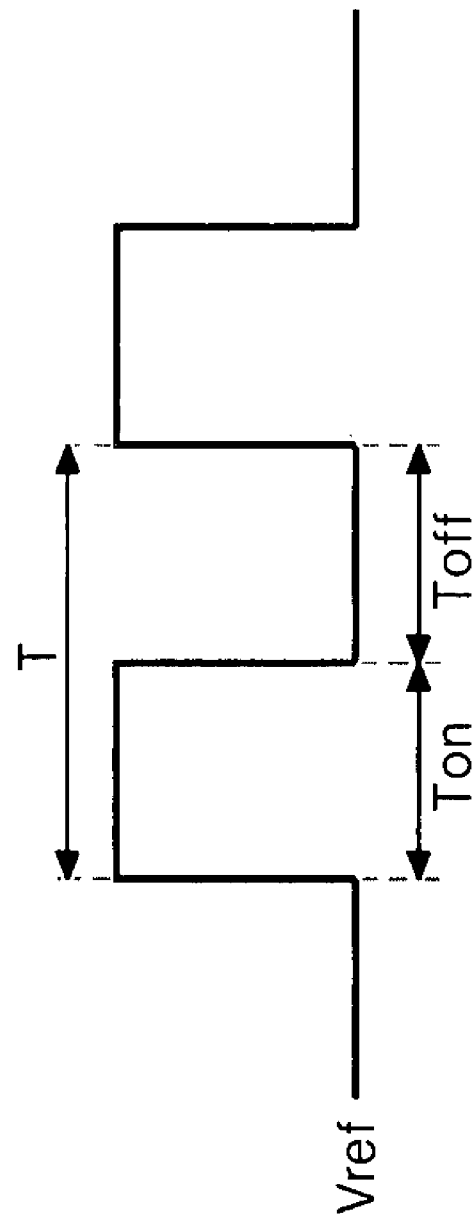
FIG. 6 shows an exemplary pulse width control signal according to an embodiment of the invention.

FIG. 6 shows an exemplary pulse width control signal according to an embodiment of the present invention. As shown in FIG. 6, the pulse width modulation signal has a specific period T where an on-time Ton maintaining a voltage higher than a reference voltage Vref and an off-time Toff maintaining the reference voltage Vref repeats periodically to control a backlight driving signal supplied to the backlight assembly 210. Herein, the on-time Ton of the pulse width modulation signal can be adjusted within the specific period T according to a bright control range of the backlight assembly 210. If the on-time Ton of the pulse width modulation signal is set as 100% within the specific period T, i.e. a duty ratio of the pulse width modulation signal is set as 100%, the brightness of the backlight assembly 210 reaches its maximum level. If the on-time Ton of the pulse width modulation signal is set as 50% within the specific period T, i.e. a duty ratio of the pulse width modulation signal is set as 50%, the brightness of the backlight assembly 210 decreases by a certain level. Accordingly, as the inverter 230 changes a duty ratio of the pulse width modulation signal so that the pulse width modulation signal has a duty ratio calculated by the duty ratio controller 220, the backlight driving signal, for example the driving voltage and current to drive that backlight assembly 210, changes.

Figure 7:
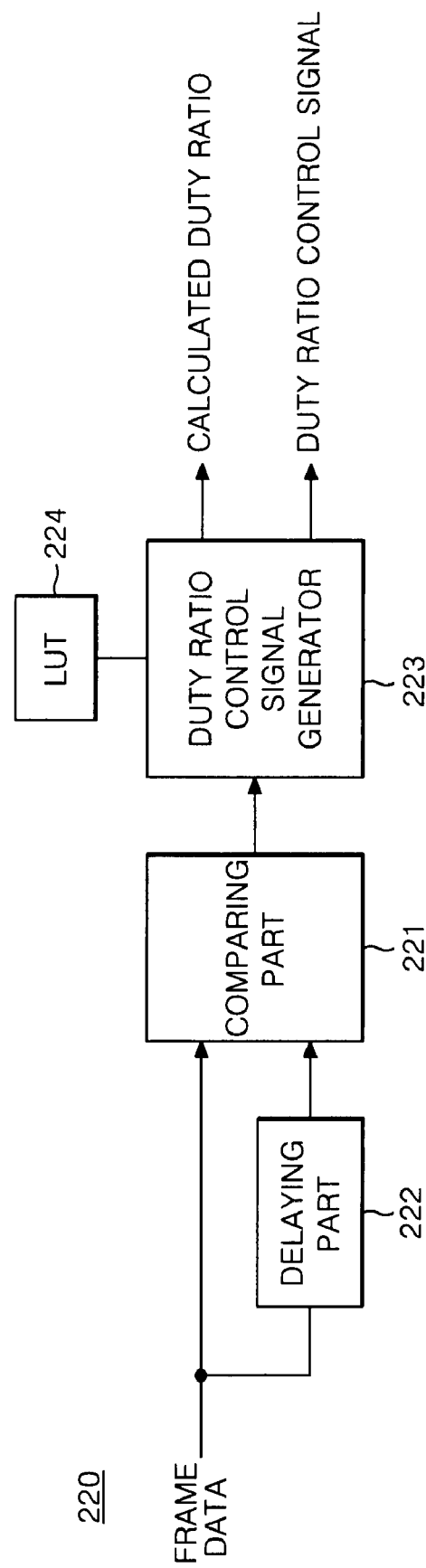
FIG. 7 shows an exemplary duty ratio controller according to an embodiment of the present invention.

FIG. 7 shows an exemplary duty ratio controller according to an embodiment of the present invention. The duty ratio controller 220 includes a comparing part 221 to receive video data inputted during a current frame (i.e. a current frame data), a delaying part 222 to delay video data inputted during one or a plurality of frames (i.e. input frame data) for a specific time and to supply the delayed frame data to the comparing part 221, and a duty ratio control signal generator 223 to generate a duty ratio control signal having a duty ratio achieved in response to a comparison result of the comparing part 221.

The comparing part 221 is connected to a system that supplies video data or to the timing controller 190 to receive the current frame data. Then, the comparing part 221 compares the current frame data with video data that are sequentially inputted during the previous 3 frame before the current frame data (i.e. previous 3 frame data) to detect a quantity of changes of video data between sequentially inputted 4 frame data. Herein, the current frame data is video data inputted to the LCD device 220 during the current one frame Fn and the previous 3 frame data are video data inputted during three frame Fn-1 to Fn-3 prior to the current frame Fn.

A quantity of change of video data between a plurality of frames can be determined by comparing video data of one frame with video data of another frame. In this case, video data between frames are compared with each other, pixel by pixel, in the whole effective display area of the liquid crystal panel 110 where an image is displayed. Also, video data between frames may be compared with each other, pixel by pixel, in a portion of pixels among all the pixels within the whole effective display area if the portion of pixels is enough to determine whether an image displayed on the liquid crystal panel 110 is a still picture or a motion picture.

The delaying part 222 delays a frame data inputted during one frame for a specific time and supplies the delayed frame data to the comparing part 221.

The duty ratio control signal generator 223 generates a duty ratio control signal having a duty ratio achieved in response to the comparison result of the comparing part 221. The duty ratio control signal generator 223 achieves a duty ratio corresponding to the comparison result of the comparing part 221 from a look up table LUT 224 and outputs a duty ratio control signal having the achieved duty ratio to the inverter 230.

More specifically, in the look up table LUT 224, a plurality of duty ratios and a plurality of levels that represent quantities of change of video data between frames are set to correspond to each other. Further, a duty ratio in the look up table LUT 224 is set to be increased, as a corresponding quantity of change of video data between frames decreases. Also, a duty ratio in the look up table LUT 224 is set to be decreased, as a corresponding quantity of change of video data between frames increases. In an embodiment of the invention, four sequentially inputted frames of data are compared to each other to determine the quantities of change of video data. In another embodiment, the number of compared frames of data can be changed. Accordingly, the number of duty ratios and levels representing quantities of change of video data between frames set in the look up table LUT 224 can be changed depending on the number of compared frame data. For example, the duty ratio controller 220 can determine quantities of change between a plurality of frames that are sequentially inputted in a following manner.

At first, the comparing part 221 compares video data of a current frame Fn with video data of preceding 3 frames Fn-1 to Fn-3 that are sequentially inputted in a certain area of the liquid crystal panel 110, pixel by pixel, and supplies the comparison result to the duty ratio control signal generator 223. Then, the duty ratio control signal generator 223 generates a duty ratio corresponding to the comparison result from the look up table LUT 224 and supplies the achieved duty ratio to the inverter 230. Also, the duty ratio control signal generator 223 supplies a duty ratio control signal that is used to control a pulse width modulation signal having the determined duty ratio to the inverter 230.

In other words, the comparing part 221 compares video data of a current frame Fn, pixel by pixel, with video data of a preceding frame Fn-1 that is inputted just before the current frame data Fn. If the comparison result shows that the number of pixels where video data changes between the 2 sequentially inputted frames Fn and Fn-1 is higher than a specific value, the comparing part 221 outputs an image change detection signal indicating a change of an image between the 2 sequentially inputted frames Fn and Fn-1. For example, if a ratio of the number of pixels where video data changes between the 2 frames Fn and Fn-1 to the whole number of pixels within an effective display area of the liquid display panel 110, exceeds 50%, it can be considered as there is a change of an image between the 2 frames Fn and Fn-1.

Also, the comparing part 221 repeats comparing video data between every 2 consecutive frames, i.e. between the Fn-1 frame and a Fn-2 frame inputted prior to the current frame Fn by 2 frame periods, and between the Fn-2 frame and a Fn-3 frame inputted prior to the current frame Fn by 3 frame periods. Then, the duty ratio control signal generator 223 counts the number of changes between the 2 consecutive frames among the 4 sequentially inputted frames. Herein, if the counted number of changes is large, it means the quantity of change of video data is big as well and an image displayed on a screen is rapidly moving. On the contrary, if the counted number of changes is small, it means the quantity of change of video data is small and an image displayed on a screen is moving slowly. Also, if the counted number of changes is zero, an image displayed on a screen can be considered as a still picture that does not move on a screen for a while. Herein, if only 2 sequentially inputted frames are compared, an image may be discriminated into 2 types, whether it is a still picture or a motion picture. However, as at least 3 sequentially inputted frames are compared according to the present invention, an image can be discriminated into a plurality of types depending on its quantity of change of video data, whether it is a still picture, a motion picture moving slowly or a motion moving rapidly. Then, the duty ratio control signal generator 223 can achieve a duty ratio corresponding to the counted number of changes that represents a quantity of change of video data from the look up table 224 and supplies the achieved duty ratio to the inverter 230.

More specifically, if the number of changes between the 2 adjacent frames happens among sequentially inputted 4 frames is zero, the duty ratio control signal generator 223 determines an image displayed on a screen as a still picture. Then, the duty ratio control signal generator 223 achieves the highest duty ratio among duty ratios set in the look up table 224 and supplies it, together with a duty ratio control signal, to the inverter 230. At this moment, the duty ratio control signal generator 223 outputs a duty ratio corresponding to 100% of the duty ratio of the pulse width modulation signal.

If the number of changes between the 2 adjacent frames happens among sequentially inputted 4 frames is '1', the duty ratio control signal generator 223 determines an image displayed on a screen as a motion picture that changes at the lowest level among various levels for motion pictures. For example, if video data changes in any one of between the Fn frame and the Fn-1 frame, between the Fn-1 frame and the Fn-2 frame, and between the Fn-2 frame and the Fn-3 frame, the number of changes is considered to be '1'. Then, the duty ratio control signal generator 223 achieves a corresponding duty ratio from the look up table 224 and supplies it, together with a duty ratio control signal, to the inverter 230. At this moment, the duty ratio control signal generator 223 outputs a duty ratio corresponding to 80% of duty ratio of the pulse width modulation signal.

If the number of changes between the 2 adjacent frames happens among sequentially inputted 4 frames is '2', the duty ratio control signal generator 223 determines an image displayed on a screen as a motion picture that changes at an average level among various levels for motion pictures. For example, if video data is not changed only in any one of between the Fn frame and the Fn-1 frame, between the Fn-1 frame and the Fn-2 frame, and between the Fn-2 frame and the Fn-3 frame, while video data changes in the other neighboring 2 frames, the number of changes is considered to be '2'. Then, the duty ratio control signal generator 223 achieves a corresponding duty ratio from the look up table 224 and supplies it, together with a duty ratio control signal, to the inverter 230. At this moment, the duty ratio control signal generator 223 outputs a duty ratio corresponding to 65% of duty ratio of the pulse width modulation signal.

If the number of changes between the 2 adjacent frames happens among sequentially inputted 4 frames is '3', the duty ratio control signal generator 223 determines an image displayed on a screen as a motion picture that changes at the highest level among various levels for motion pictures. For example, if video data between the Fn frame and the Fn-1 frame, between the Fn-1 frame and the Fn-2 frame, and between the Fn-2 frame and the Fn-3 frame are all changed, the number of changes is considered to be '3'. Then, the duty ratio control signal generator 223 achieves the lowest duty ratio set in the look up table 224 and supplies it, together with a duty ratio control signal, to the inverter 230. At this moment, the duty ratio control signal generator 223 outputs a duty ratio corresponding to 50% of duty ratio of the pulse width modulation signal.

In addition, the quantities of change of video data between a plurality of frames that are sequentially inputted also can be determined in a following manner. For example, the comparing part 220 compares video date between every 2 neighboring frames among 4 sequentially inputted frames and supplies a ratio of the number of pixels where video data changes between the 2 neighboring frames to the whole number of pixels within an effective display area of the liquid display panel 110, i.e a ratio of pixel change, directly to the duty ratio control signal generator 223. Then, the duty ratio control signal generator 223 may receive ratios of pixel change for 3 times in total for the 4 sequentially inputted frames. And the duty ratio control signal generator 223 adds all the ratios of pixel change received for 3 times and determines a quantity of change of video data according to the sum of the ratios of pixel change. Herein, if the sum of the ratios of pixel change is big, the duty ratio control signal generator 223 can fetch a duty ratio having a high value from the look up table 224. On the contrary, if the sum of the ratios of pixel is small, the duty ratio control signal generator 223 can fetch a duty ratio having a low value from the look up table 224.

Further, the quantities of change of video data between a plurality of frames that are sequentially inputted also can be determined in a following manner. The delaying part 222 may temporarily store all video data of 4 frames that are sequentially inputted. Then, the comparing part 220 compares the video date of the 4 frames each other stored in the delaying part 222 when video data of a current frame is inputted and outputs the comparison results to the duty ratio control signal generator 223. Then the duty ratio control signal generator 223 can achieve a duty ratio corresponding to the number of changes in video data between 2 neighboring frames or to the sum of ratios of pixel change where data are changed between every 2 neighboring frames among the 4 sequentially inputted frames.

Figure 8:
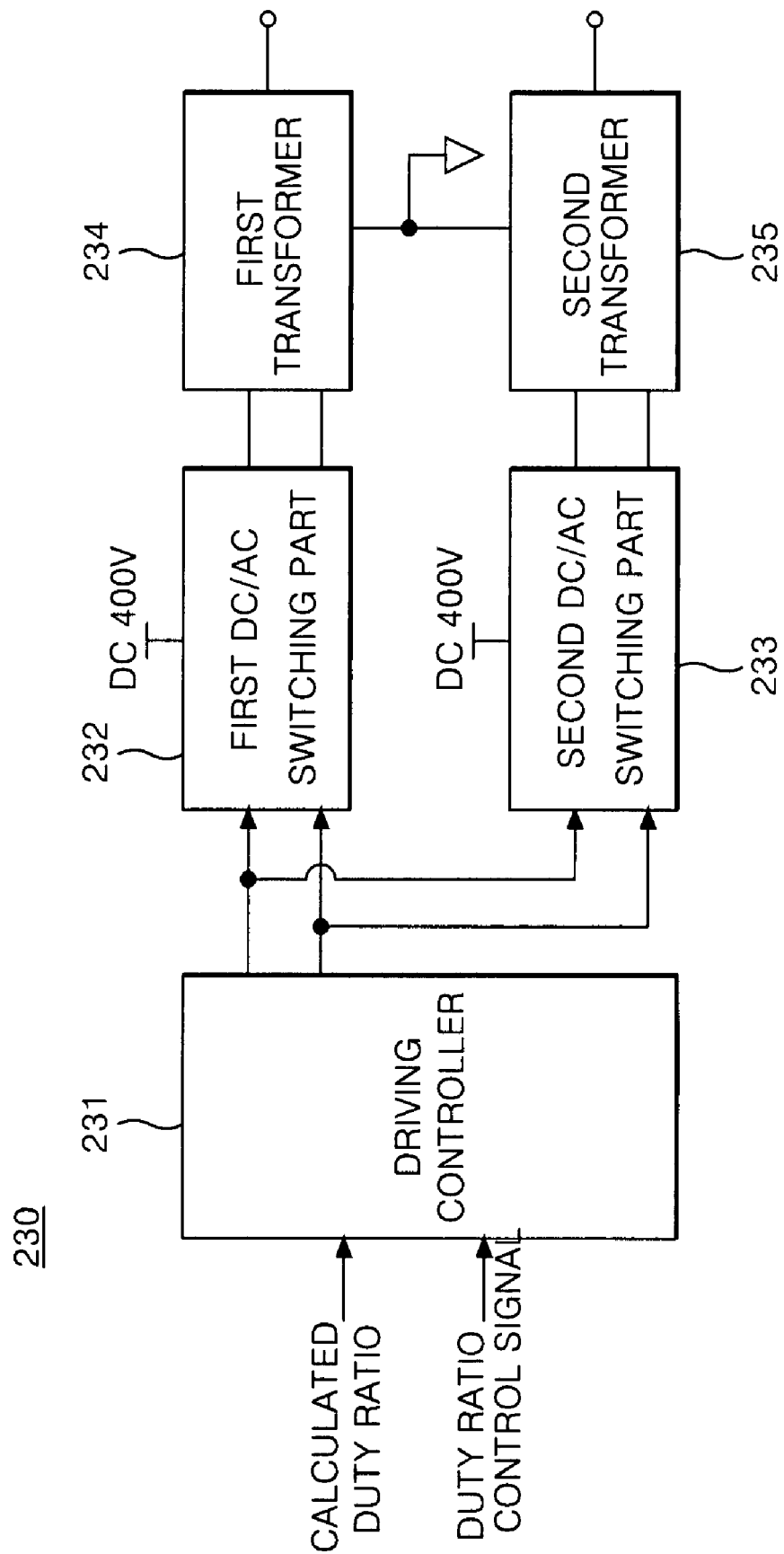
FIG. 8 shows an exemplary inverter according to an embodiment of the invention.

FIG. 8 shows an exemplary inverter according to an embodiment of the invention. Referring to FIG. 8, the inverter 230 includes a driving controller 230 to control of a driving of the backlight assembly 210 according to a burst dimming signal, first and second DC/AC switching parts 232, 233 to output an AC voltage of 400 Vrms by switching a DC high voltage of 400V provided from a voltage source according to a pulse width modulation signal from the driving controller 230, a first transformer 234 to raise the AC voltage from 400 Vrms provided by the first DC/AC switching parts 232 to a AC voltage of 750 Vrms and to supply the AC voltage of 750 Vrms to one side of the backlight assembly 210, a second transformer 235 to raise the AC voltage from 400 Vrms provided by the second DC/AC switching parts 233 to an AC voltage of 750 Vrms and to supply the AC voltage of 750 Vrms which has a reverse phase compared with that of the AC voltage of 750 Vrms outputted from the first transformer 234 to the other side of the backlight assembly 210.

The driving controller 231 generates a pulse width modulation signal to control the switching operation of the first and second DC/AC switching parts 232, 233 and supplies it to the first and second DC/AC switching parts 232, 233. Herein, the driving controller 231 receives a duty ratio control signal together with an achieved duty ratio and changes a duty ratio of a pulse width modulation signal in response to the duty ratio control signal so that the duty ratio of a pulse width modulation signal becomes equal to the achieved duty ratio.

The first DC/AC switching part 232 switches a DC high voltage of 400V provided from a voltage source according to a pulse width modulation signal provided from the driving controller 231 to generate an AC voltage of 400 Vrms and supplies the AC voltage of 400 Vrms to the first transformer 234. In other words, the first DC/AC switching part 232 supplies a positive (+) AC voltage of 400 Vrms and a negative (−) AC voltage of 400 Vrms to the first transformer 234 through two different signal paths, respectively. A switching period of the first DC/AC switching part 232 changes in proportion to a duty ratio of a pulse width modulation signal provided from the driving controller 231. For example, the switching period of the first DC/AC switching part 232 increases as the duty ratio of a pulse width modulation signal increases. On the contrary, the switching period of the first DC/AC switching part 232 decreases as the duty ratio of a pulse width modulation signal decreases. In other words, if the switching period of the first DC/AC switching part 232 is increased, proportionally the driving current and voltage is increased to increase the brightness of the backlight assembly 210. On the contrary, if the switching period of the first DC/AC switching part 232 is decreased, proportionally the driving current and voltage is decreased to decrease the brightness of the backlight assembly 210.

The second DC/AC switching part 233 switches a DC high voltage of 400V provided from a voltage source according to a pulse width modulation signal provided from the driving controller 231 to generate an AC voltage of 400 Vrms and supplies the AC voltage of 400 Vrms to the second transformer 235. In other words, the second DC/AC switching part 233 supplies a positive (+) AC voltage of 400 Vrms and a negative (−) AC voltage of 400 Vrms to the second transformer 235 through two different signal paths, respectively. A switching period of the second DC/AC switching part 233 changes in proportion to a duty ratio of a pulse width modulation signal provided from the driving controller 231. For example, the switching period of the second DC/AC switching part 233 increases as the duty ratio of a pulse width modulation signal increases. On the contrary, the switching period of the second DC/AC switching part 233 decreases as the duty ratio of a pulse width modulation signal decreases. In other words, if the switching period of the second DC/AC switching part 233 is increased, proportionally the driving current and voltage is increased to increase the brightness of the backlight assembly 210. On the contrary, if the switching period of the second DC/AC switching part 233 is decreased, proportionally the driving current and voltage is decreased to decrease the brightness of the backlight assembly 210.

Meanwhile, the first and second DC/AC switching parts 232, 233 output an AC voltage of 400 Vrms having a same phase with each other, respectively.

The first transformer 234 raises an AC voltage of 400 Vrms inputted from the first DC/AC switching part 232 through the two signal paths to an AC voltage of 750 Vrms and outputs the AC voltage of 750 Vrms to one side of the backlight assembly 210. The second transformer 235 raises an AC voltage of 400 Vrms inputted from the second DC/AC switching part 233 through the two signal paths and outputs an AC voltage of 750 Vrms having a reverse phase compared with that of the AC voltage of 750 Vrms outputted by the first transformer 234 to the other side of the backlight assembly 210.

As the AC voltage of 750 Vrms is supplied to each of the both sides of the backlight assembly 210 respectively, substantially an AC voltage of 1500 Vrms in total is supplied to the backlight assembly 210.

While an exemplary inverter is implemented to include the first and second transformers 234, 235 to supply an AC voltage of 750 Vrms to each side of the backlight assembly 210, the amount of a voltage supplied to the backlight assembly 210 may be varied according to the types the backlight assembly 210 or the number of lamps formed inside of it.

Figure 9:
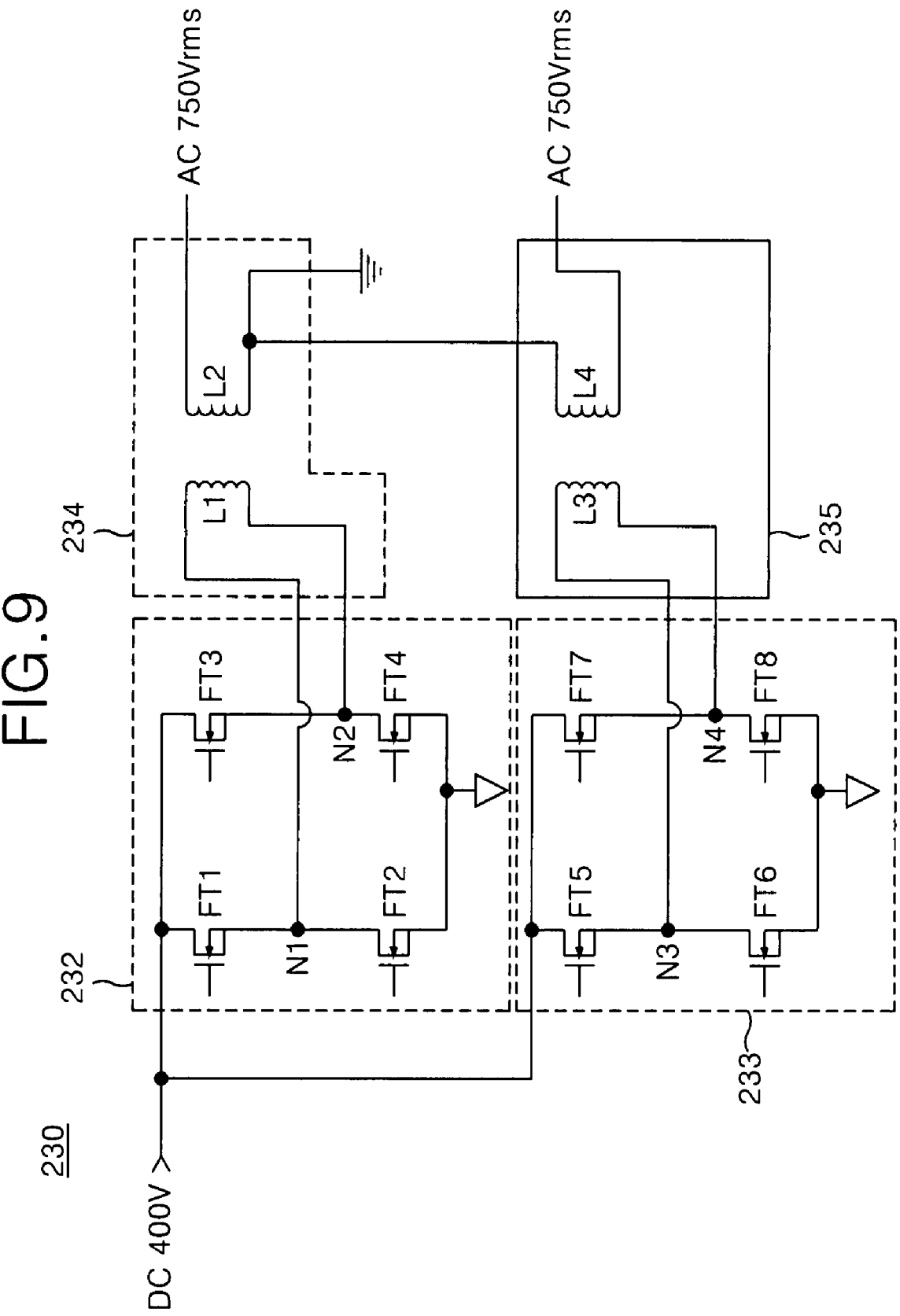
FIG. 9 shows a circuit diagram of an exemplary inverter in the LCD device of FIG. 5.

FIG. 9 shows a circuit diagram of an exemplary inverter in the LCD device of FIG. 5. Referring to FIG. 9, the first DC/AC switching part 232 includes first and second N-type metal-oxide semiconductor field effect transistors FT1 and FT2 (hereinafter referred to as NMOSFET) connected in series with each other between an output terminal of a voltage source and a ground, and third and fourth NMOS FETs FT3 and FT4 connected in series with each other between the output terminal of a voltage source and the ground and in symmetrically parallel with the first and second NMOS FETs FT1 and FT2.

A drain electrode of the first NMOS FET FT1 receives a DC high voltage of 400V provided by a voltage source, a gate electrode thereof receives a pulse width modulation signal provided by the driving controller 231, and a source electrode thereof is connected to a first output node N1.

A drain electrode of the second NMOS FET FT2 is commonly connected to the source electrode of the first NMOS FET FT1 and the first output node N1, a gate electrode thereof receives a pulse width modulation signal provided by the driving controller 231, and a source electrode thereof is connected to the ground.

A drain electrode of the third NMOS FET FT3 receives a DC high voltage of 400V provided by a voltage source, a gate electrode thereof receives a pulse width modulation signal provided by the driving controller 231, and a source electrode thereof is connected to a second output node N2.

A drain electrode of the fourth NMOS FET FT4 is commonly connected to the source electrode of the third NMOS FET FT3 and the second output node N2, a gate electrode thereof receives a pulse width modulation signal provided by the driving controller 231, and a source electrode thereof is connected to the ground. Herein, the first and second output nodes N1, N2 are connected to an input end of the first transformer 234.

The second DC/AC switching part 233 includes fifth and sixth NMOS FETs FT5, FT6 connected in series with each other between the output terminal of the voltage source and the ground, and seventh and eighth NMOS FETs FT7 and FT8 connected in series with each other between the output terminal of the voltage source and the ground and in symmetrically parallel with the fifth and sixth NMOS FETs FT5 and FT6.

A drain electrode of the fifth NMOS FET FT5 receives a DC high voltage of 400V provided by a voltage source, a gate electrode thereof receives a pulse width modulation signal provided by the driving controller 231, and a source electrode thereof is connected to a third output node N3.

A drain electrode of the sixth NMOS FET FT6 includes is commonly connected to the source electrode of the fifth NMOS FET FT5 and the third output node N3, a gate electrode thereof receives a pulse width modulation signal provided by the driving controller 231, and a source electrode thereof is connected to the ground.

A drain electrode of the seventh NMOS FET FT7 receives a DC high voltage of 400V provided by a voltage source, a gate electrode thereof receives a pulse width modulation signal provided by the driving controller 231, and a source electrode thereof is connected to a fourth output node N4.

A drain electrode of the eighth NMOS FET FT8 is commonly connected to the source electrode of the seventh NMOS FET FT7 and the fourth output node N4, a gate electrode thereof receives a pulse width modulation signal provided by the driving controller 231, and a source electrode thereof is connected to the ground.

Herein, the third and fourth output nodes N3 and N4 are connected to an input end of the second transformer 235.

The first transformer 234 includes a primary coil L1, one end of which is connected to the first output node N1 and the other end of which is connected to the second output node N2 of the first DC/AC switching part 232, and a secondary coil L2 one end of which is connected to the backlight assembly 210 and the other end of which is connected to a ground.

The second transformer 235 includes a primary coil L3 one end of which is connected to the third output node N3 and the other end of which is connected to the fourth output node N4 of the second DC/AC switching part 233, and a secondary coil L4 one end of which is connected to the backlight assembly 210 and the other end of which is connected to a ground.

Especially, the coils L1 and L2 of the first transformer 234 and the coils L3 and L4 of the second transformer 235 are wound in the opposite direction with each other. Therefore, an AC voltage of 750 Vrms outputted from the first transformer 234 has a reverse phase compared with that of the AC voltage of 750 Vrms outputted from the second transformer 235.

Referring FIG. 9 to FIG. 12, operating principles of the inverter 230 having a circuit structure as explained above will be explained in detail. As shown in FIG. 9, if the driving controller 231 supplies a pulse width modulation signal of a high level to the gate electrodes of the first and fourth NMOS FETs FT1 and FT4 in the first DC/AC switching part 232 and, at the same time, to the gate electrodes of the fifth and eighth NMOS FETs FT5 and FT8 in the second DC/AC switching part 233, the first and fourth NMOS FETs FT1, FT4 and the fifth and eighth NMOS FETs FT5 and FT8 are turned on simultaneously.

Therefore, in the first DC/AC switching part 232, a DC high voltage of 400 V is switched by the first NMOS FET FT1 and outputted to the first transformer 234 via the first output node N1, when a signal path is formed from the voltage source supplying the DC high voltage of 400 V, sequentially through the first NMOS FET FT1, the first output node N1, a primary coil L1 of the first transformer 234, the second output node N2 and the fourth NMOS FET FT4, to the ground.

In the second DC/AC switching part 233, a DC high voltage of 400 V is switched by the fifth NMOS FET FT5 and outputted to the second transformer 235 via the third output node N3, when a signal path is formed from the voltage source supplying the DC high voltage of 400 V, sequentially through the fifth NMOS FET FT5, the third output node N3, a primary coil L3 of the second transformer 235, the fourth output node N4 and the eight NMOS FET FT8, to the ground.

Figure 10:
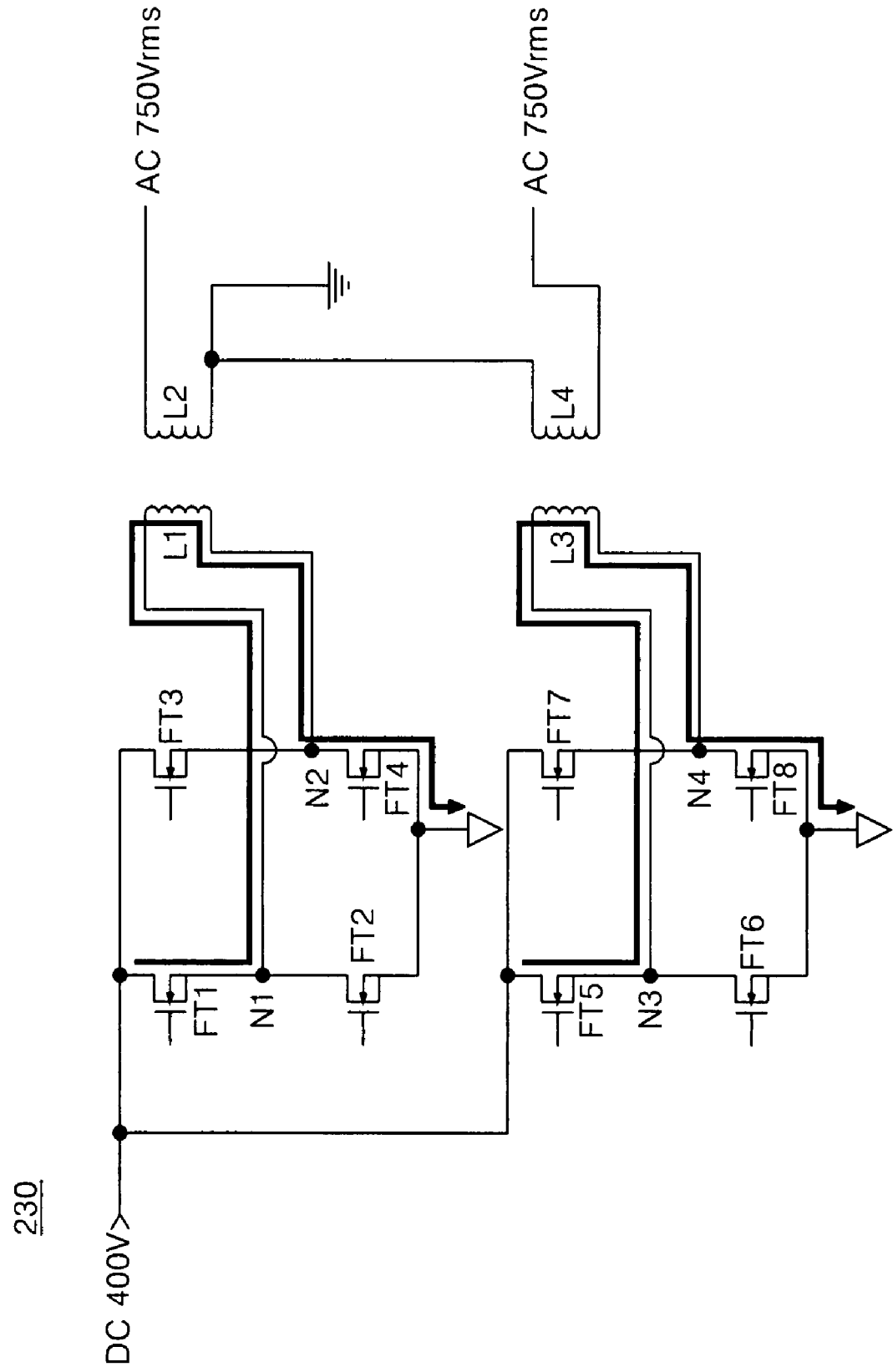
FIGS. 10 and 11 are diagrams illustrating operating principles of an exemplary inverter of FIG. 5.

As shown in FIG. 10, if the driving controller 231 supplies a pulse width modulation signal of a high level to the gate electrodes of the second and third NMOS FETs FT2, FT3 in the first DC/AC switching part 232 and, at the same time, to the gate electrodes of the sixth and seventh NMOS FETs FT6 and FT7 in the second DC/AC switching part 233, the second and third NMOS FETs FT2 and FT3 and the sixth and seventh NMOS FETs FT6 and FT7 are turned on simultaneously.

Therefore, in the first DC/AC switching part 232, a DC high voltage of 400 V is switched by the third NMOS FET FT3 and outputted to the first transformer 234 via the second output node N2, when a signal path is formed from the voltage source supplying the DC high voltage of 400 V, sequentially through the third NMOS FET FT3, the second output node N2, a primary coil L1 of the first transformer 234, the first output node N1 and the second NMOS FET FT2, to the ground.

In the second DC/AC switching part 233, a DC high voltage of 400 V is switched by the seventh NMOS FET FT7 and outputted to the second transformer 235 via the fourth output node N4, when a signal path is formed from the voltage source supplying the DC high voltage of 400 V, sequentially through the seventh NMOS FET FT7, the fourth output node N4, a primary part coil L3 of the second transformer 235, the third output node N3 and the sixth NMOS FET FT6, to the ground.

Figure 11:
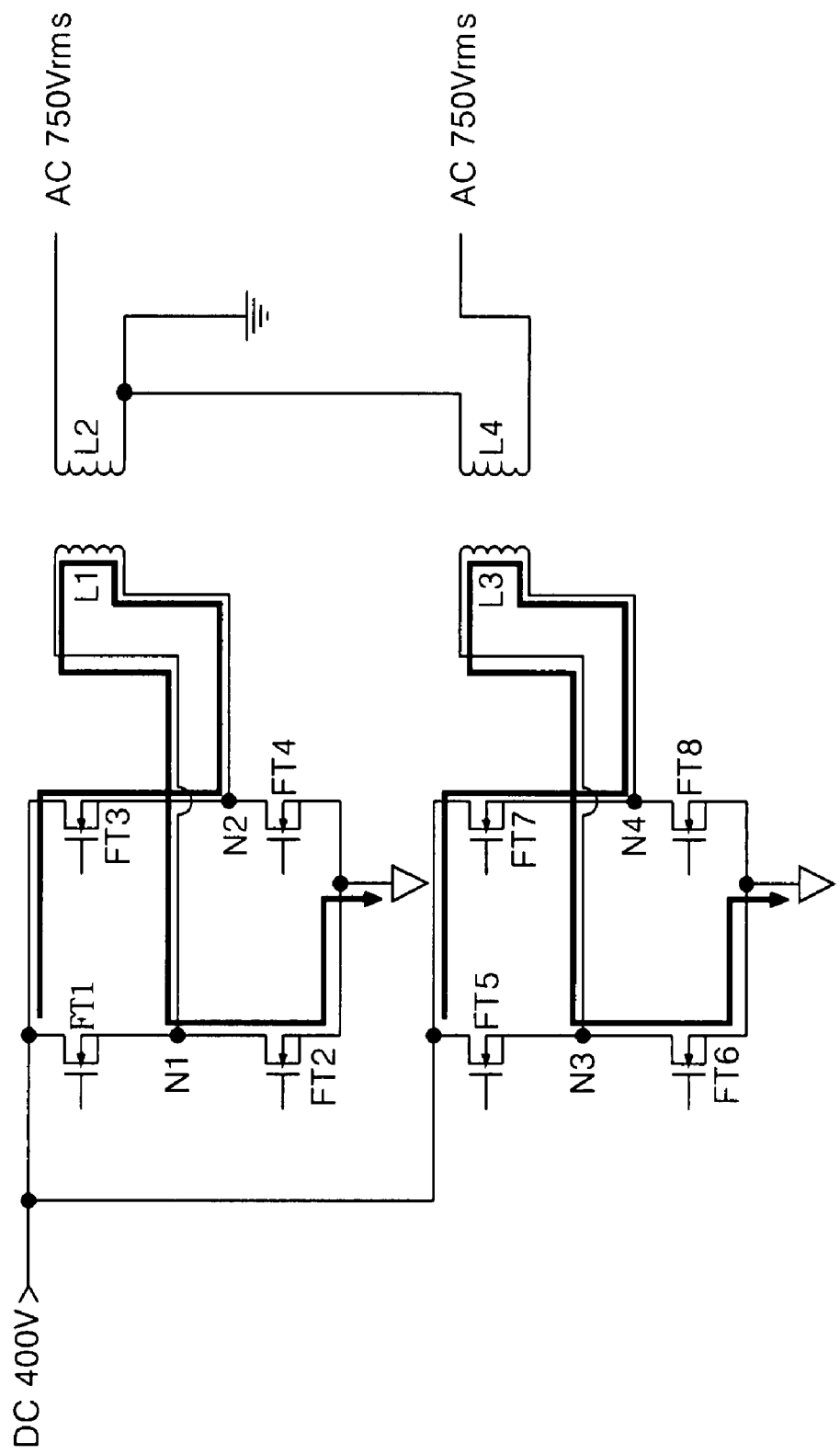

As the signal path formed through the first and fourth NMOS FETs FT1 and FT4 is established in the opposite direction with that formed through the second and third NMOS FETs FT2 and FT3, the first DC/AC switching part 232 switches a DC high voltage of 400V into two directions according to the pulse width modulation signal, as shown in FIG. 11, and supplies a positive (+) AC voltage of 400 Vrms and a negative (−) AC voltage of 400 Vrms to the both ends of the primary coil L1 of the first transformer 234.

And, as the signal path formed through the fifth and eighth NMOS FETs FT5 and FT8 is established in the opposite direction with that formed through the sixth and seventh NMOS FETs FT6 and FT7, the second DC/AC switching part 233 switches a DC high voltage of 400V into two directions according to the pulse width modulation signal, as shown in FIG. 11, and supplies a positive (+) AC voltage of 400 Vrms and a negative (−) AC voltage of 400 Vrms to the both ends of the primary coil L3 of the second transformer 235.

Figure 12:
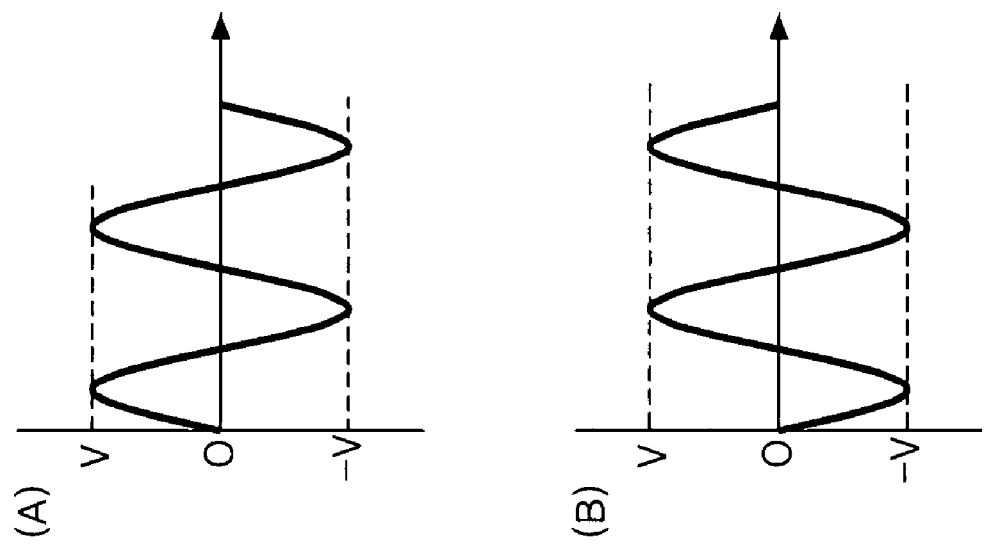
FIG. 12 is a diagram illustrating an operating characteristic of an exemplary inverter of FIG. 5.

Also, as shown in FIG. 12, as the coils L1 and L2 of the first transformer 234 and the coils L3 and L4 of the second transformer 235 are wound in the opposite direction with each other, an AC voltage of 750 Vrms outputted from the first transformer 234, as shown in FIG. 12 (A), has a reverse phase compared with that of the AC voltage of 750 Vrms outputted from the second transformer 235, as shown in FIG. 12 (B).

Figure 13:
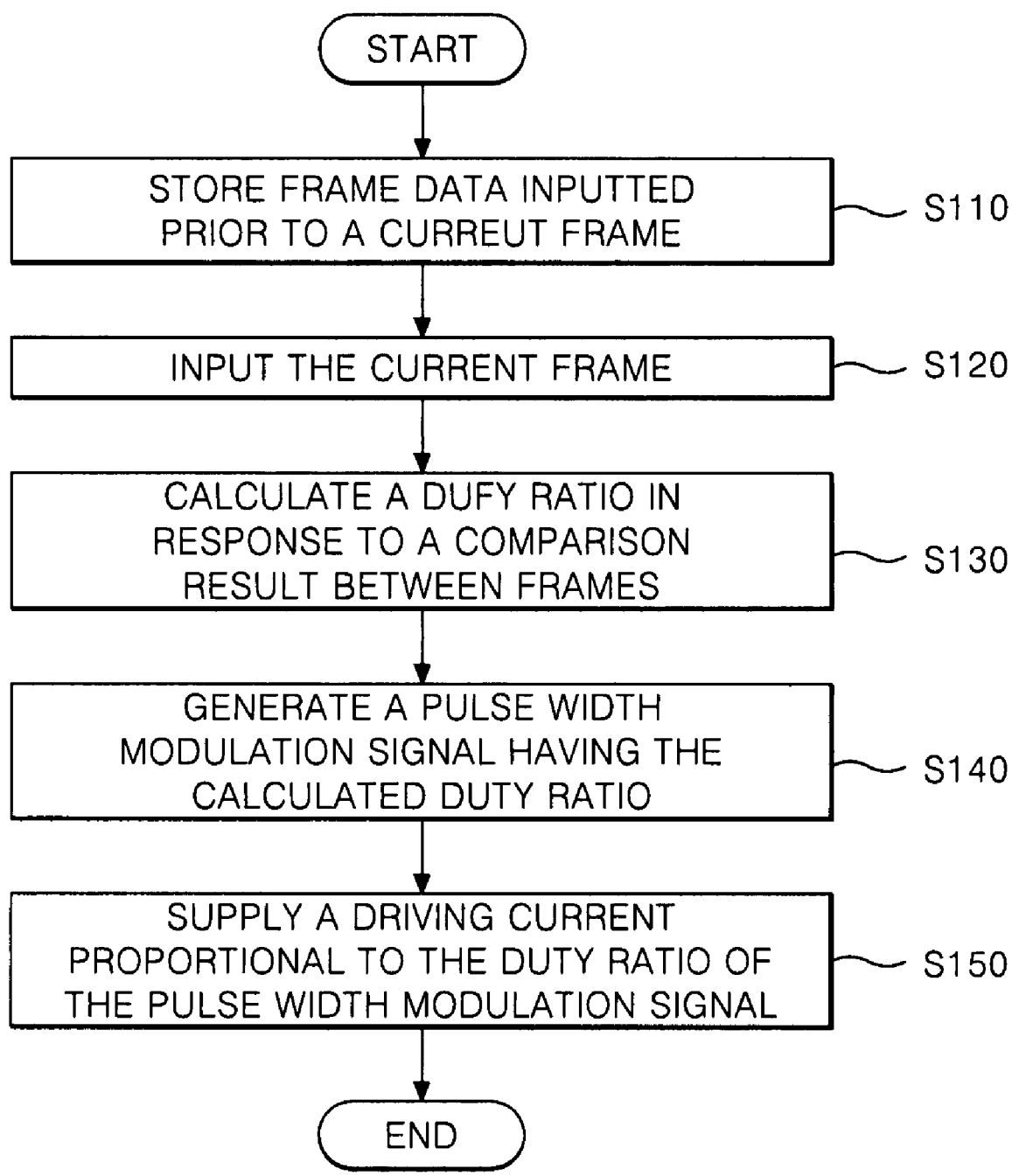
FIG. 13 is a flow chart illustrating an exemplary driving method of an LCD device according to an embodiment of the present invention.

FIG. 13 is a flow chart illustrating an exemplary driving method of an LCD device according to an embodiment of the present invention. Referring to FIG. 13, to determine an amount of movement of an image displayed on a screen, the duty ratio controller 220 temporally stores one or a plurality of frame data that are sequentially inputted prior to a current frame Fn (S110). Then, if the duty ratio controller 220 receives the current frame data inputted from a system (S120), it compares the current frame data with the one or a plurality of frame data that are sequentially inputted prior to the current frame to calculate a duty ratio in response to the comparison result, and supplies the calculated duty ratio to the inverter 230, together with a duty ratio control signal to control generating a pulse width modulation signal having the calculated duty ratio (S130)

After that, the inverter 230 generates a pulse width modulation signal having a duty ratio that is equal to the calculated duty ratio in response to the duty ratio control signal provided by the duty ratio controller 220 (S140). Then, the inverter 230 supplies a driving current and voltage that is proportional to the duty ratio of the pulse width modulation signal to the backlight assembly 210 to increase or decrease the brightness of the backlight assembly 210.

Figure 14:
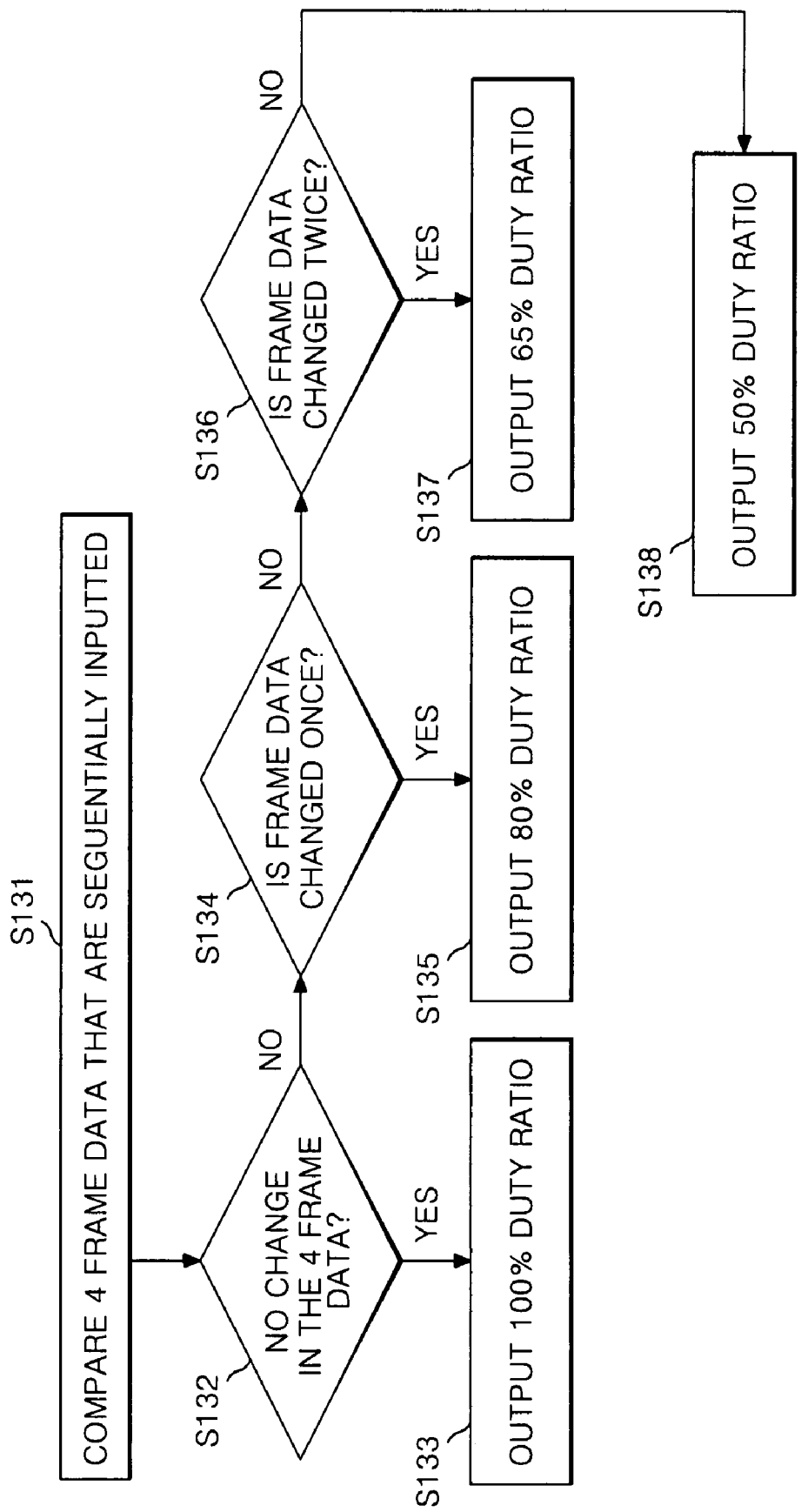
FIG. 14 is a flow chart detailing an exemplary step of determining duty ratios of an driving method of FIG. 13.

FIG. 14 is a flow chart detailing an exemplary step of determining duty ratios of an driving method of an LCD device of FIG. 13. Referring to FIG. 14, the duty ratio controller 220, when it receives a current frame data, compares the current frame data with one or a plurality of frame data that were sequentially inputted prior to a current frame Fn and stored temporally (S131). In step S131, the duty ratio controller 220 compares every two neighboring frame data that are sequentially inputted. In other words, the duty ratio controller 220 compares a current frame data inputted during a current frame period with a previous frame data inputted during one frame period just before the current frame period. The comparison process of two neighboring frame data is repeated for all the inputted 4 frame data. In an exemplary embodiment of the present invention, 4 sequentially inputted frame data including the current frame data are compared with each other, but the number of the compared frame data may be changed.

The duty ratio controller 220 determines whether there is a change between two neighboring frame data among the 4 sequentially inputted frame data by the comparison result of step S131 (S132). Then, if there is no change between the 4 sequentially inputted frame data, the duty ratio controller 220 determines that an image displayed on a screen is a still picture and fetch the highest duty ratio among duty ratios set in the look up table 224 and supplies the achieved duty ratio to the inverter 230, together with a duty ratio control signal (S133). In step S133, the duty controller 220 outputs a duty ratio corresponding to 100% of the duty ratio of the pulse width modulation signal, as an image displayed on a screen is a still picture.

If, as a result of the determination at step S132, frame data changes between the 4 sequentially inputted frame data, the duty ratio controller 220 determines whether frame data between two neighboring frames has changed just once through the 4 sequentially inputted frame data (S134). Then, if frame data between two neighboring frames has changed just once, the duty ratio controller 220 determines an image displayed on a screen as a motion picture that changes at the lowest level among various levels for motion pictures. Then, the duty ratio controller 220 fetches a corresponding duty ratio from the look up table 224 and supplies it, together with a duty ratio control signal, to the inverter 230 (S135). At this step S135, the duty ratio controller 220 outputs a duty ratio corresponding to 80% of duty ratio of the pulse width modulation signal to the inverter 230.

If, as a result of the determination at step S134, the number of a change of frame data between two neighboring frames is not one, the duty ratio controller 220 determines whether frame data between two neighboring frames has changed twice through the 4 sequentially inputted frame data (S136). Then, if frame data between two neighboring frames has changed twice, the duty ratio controller 220 determines an image displayed on a screen as a motion picture that changes at an average level among various levels for motion pictures. Then, the duty ratio controller 220 fetches a corresponding duty ratio from the look up table 224 and supplies it, together with a duty ratio control signal, to the inverter 230 (S137). At this step S137, the duty ratio controller 220 outputs a duty ratio corresponding to 65% of duty ratio of the pulse width modulation signal.

If, as a result of the determination at step S136, frame data has been changed between every two neighboring through the 4 sequentially inputted frame data, the duty ratio controller 220 determines an image displayed on a screen as a motion picture that changes at a highest level among various levels for motion pictures. Then, the duty ratio controller 220 fetches the lowest duty ratio set in the look up table 224 and supplies it, together with a duty ratio control signal, to the inverter 230 (S138). At this step S138, the duty ratio controller 220 outputs a duty ratio corresponding to 50% of duty ratio of the pulse width modulation signal.

In addition, the quantities of change of video data between a plurality of frames that are sequentially inputted also can be determined in a following manner.

For example, the comparing part 220 compares video date between every 2 neighboring frames among 4 sequentially inputted frames and supplies a ratio of the number of pixels where video data changes between the 2 neighboring frames to the whole number of pixels within an effective display area of the liquid display panel 110 directly to the duty ratio control signal generator 223. Then, the duty ratio control signal generator 223 may receive ratios of pixel change for 3 times in total for the 4 sequentially inputted frames. And the duty ratio control signal generator 223 adds the received ratios of pixel change for 3 times together and achieves according to the sum of the ratios of pixel change. Herein, if the sum of the ratios of pixel change is big, the duty ratio control signal generator 223 can fetch a duty ratio having a high value from the look up table 224. On the contrary, if the sum of the ratios of pixel change is small, the duty ratio control signal generator 223 can fetch a duty ratio having a low value from the look up table 224.

Further, the delaying part 222 may temporally store video data of 4 frames that are sequentially inputted. Then, the comparing part 220 compares video date of the 4 frames stored in the delaying part 222 each other when video data of a current frame is inputted and outputs the comparison results to the duty ratio control signal generator 223. Then the duty ratio control signal generator 223 can achieve a duty ratio corresponding to the number of changes in video data between 2 neighboring frames or to the sum of ratios of pixel where data are changed between every 2 neighboring frames among the 4 frames that are sequentially inputted.

In an embodiment of the present invention, the duty ratio controller 220 compares 4 sequential frames of data to determine an amount of movement of an image, but the number of compared frames of data can be varied.

As explained above, when controlling a duty ratio of a pulse width modulation signal in response to the amount of movement of an image according to an embodiment of the present invention, the interrelationship between duty ratios of a pulse width modulation signal, brightness of the backlight assembly 210 and motion picture response time MPRT are listed in TABLE 1 below.

TABLE 1

| Duty Ratio | Brightness(1 p) | MPRT |
|---|---|---|
| 50% | 460 nit | 10.85 ms |
| 60% | 479 nit | 11.63 ms |
| 65% | 500 nit | 11.44 ms |
| 70% | 515 nit | 12.09 ms |
| 80% | 550 nit | 13.26 ms |
| 90% | 576 nit | 13.31 ms |
| 95% | 597 nit | 13.48 ms |

As shown in TABLE 1, the LCD device according to an embodiment of the present invention has a characteristic that brightness of a backlight assembly increases as duty ratios increases, while motion picture response time MPRT increases, too. By using such a characteristic, the LCD device increases the duty ratio to its maximum level for a still picture to increase the brightness of the backlight assembly. Also, as a motion picture having a small movement is more influenced by brightness of the backlight assembly than the motion picture response time MPRT, the LCD device increases the duty ratio to a comparatively high level for the motion picture having a small movement. In other words, the LCD device increases the duty ratio of a pulse width modulation signal as the movement of an image decreases, thus increases the brightness of the backlight assembly, thereby improving a picture quality. On the contrary, a motion picture having a big movement is more influenced by the motion picture response time MPRT than the brightness of the backlight assembly. Therefore, in an embodiment of the present invention, the LCD device decreases the duty ratio of a pulse width modulation signal as the movement of an image increases, while the motion picture response time MPRT becomes short accordingly, thereby preventing a motion blurring phenomenon where a residual of a previous frame is displayed on a current frame.

Figure 15:
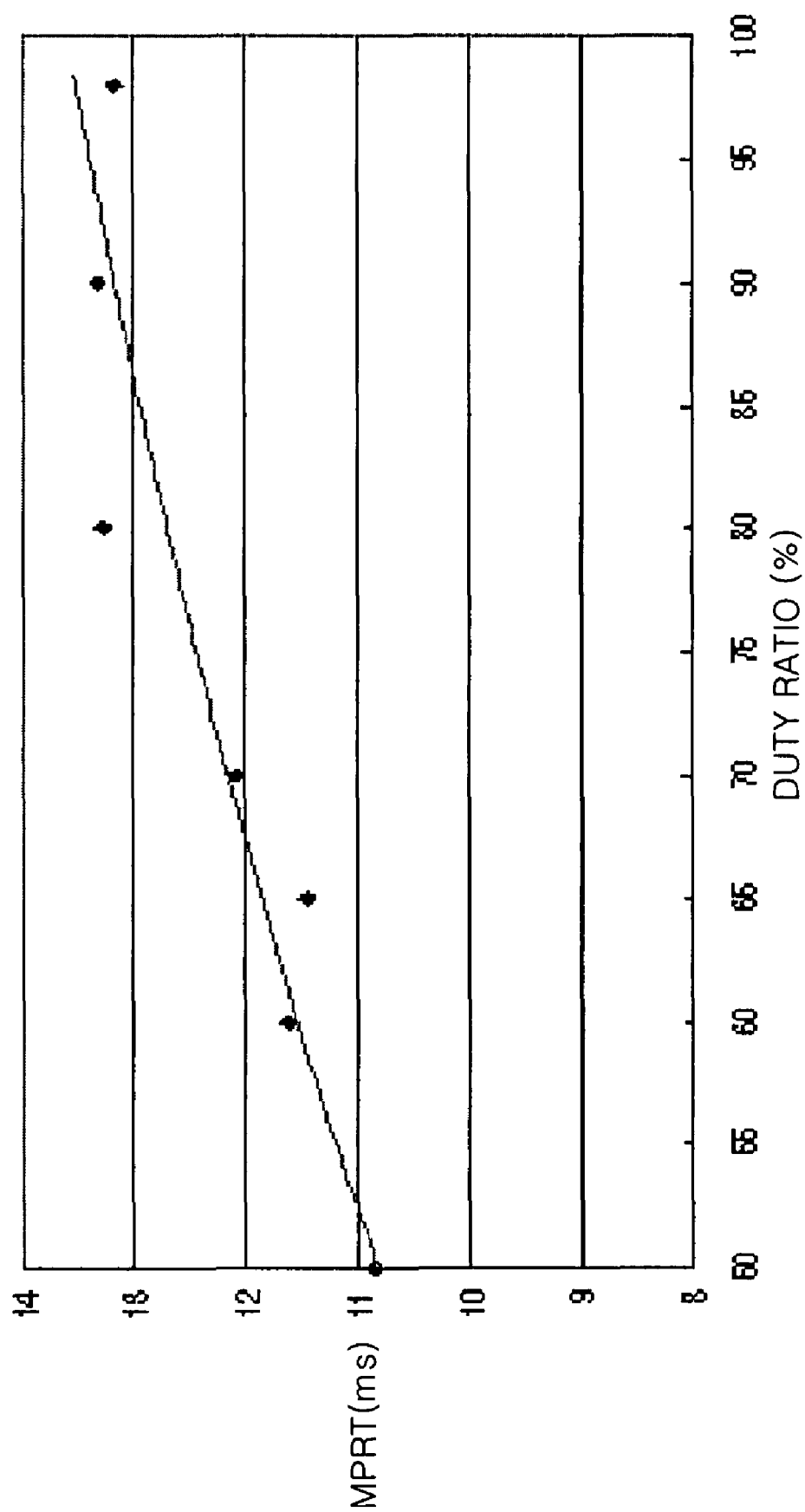
FIG. 15 is a graph illustrating an interrelationship between duty ratios and motion picture response times in a liquid crystal display.

FIG. 15 is a graph illustrating an interrelationship between duty ratio and motion picture response time in a liquid crystal display. As shown in FIG. 15, in an embodiment of the present invention, a motion picture response time MPRT is set to decrease, as a duty ratio of a pulse width modulation signal decreases.

FIG. 16 is a diagram illustrating an exemplary backlight assembly having a plurality of lamps and an exemplary driving signal to sequentially drive the plurality of lamps according to an embodiment of the present invention.

In an embodiment of the present invention, a backlight assembly 210 may include a plurality of lamps 211 that are arranged in parallel with each other and disposed on the rear surface of the liquid crystal panel 110 to provide light directly on the liquid crystal panel 110, as shown in FIG. 16. The plurality of lamps 211 are arranged also in parallel with gate lines formed on the liquid crystal panel 110. Especially, an LCD device according to an embodiment of the present invention, to prevent deterioration of picture quality caused by a motion blurring phenomenon when displaying a motion picture, has a driving timing to sequentially turn on and off the plurality of lamps 211, as shown FIG. 16 (b).

The plurality of lamps 211 are sequentially driven in one frame period, while gate lines formed on the liquid crystal panel 110 are scanned. In other words, a first lamp (1st) is turned on for a first ⅛ frame period, if gate pulses are supplied from a first gate line to at least 1+M (M is a positive integer) gate line among N (N is a positive integer greater than M) gate lines in total thereby fully supplying data voltages on data lines to liquid crystal cells, then turned off. Next, a second lamp (2nd) is turned on for a next ⅛ frame period, if gate pulses are supplied from a 1+M gate line to at least (1+M)+M gate line among N gate lines in total thereby fully supplying data voltages on data lines to liquid crystal cells, then turned off. Therefore, it has an effect that, during one frame period, the lamps corresponding to ⅞ of the whole area of the liquid crystal panel 110 are always turned off. In other words, according to a backlight scanning driving method for a plurality of lamps 211 that are disposed on the rear surface of the liquid crystal panel 110, the LCD device can be driven as an impulse type display that irradiate light for only a ⅛ frame period within one frame period.

According to the backlight scanning driving method, the LCD device drives the plurality of lamps 211 to be turned on and off in synchronization with gate scanning pulses to scan gate lines formed on the liquid crystal panel 110 and provides an impulse type lightening like an CRT, thereby preventing deterioration of picture quality caused by a motion blurring phenomenon when displaying a motion picture. Also, to turn on the plurality of lamps 211 in synchronization with corresponding gate scanning pulses for gate lines, a gate start pulse GSP indicating the scanning initiation time for the gate lines in one frame period is provided into the inverter 230. Then, the inverter 230 can control the plurality of lamps 211 to be sequentially driven in synchronization with gate scanning pulses for gate lines.

However, as only one lamp is turned on for each ⅛ frame period within one frame period according to the backlight scanning method, the brightness of the backlight assembly 210 shown in FIG. 16 (a) is only ⅛ compared with a case where all the 8 lamps are turned on for one frame period. However, as explained in conjunction with FIG. 5 to FIG. 15, the LCD device according to an embodiment of the present invention can detect the quantities of change of video data between a plurality of frames that are sequentially inputted, to determine an amount of movement of an image displayed on a screen, and increases the duty ratio of a pulse width modulation signal as a movement of an image displayed on a screen becomes small to increase the brightness of the backlight assembly thereby improving a picture quality. On the contrary, if a movement of an image displayed on a screen becomes big, the LCD device according to an embodiment of the present invention decreases the duty ratio of a pulse width modulation signal to decrease the brightness of the backlight assembly while make the motion picture response time MPRT become short accordingly, thereby protecting a motion blurring phenomenon where a residual of a previous frame is displayed on the current frame.

As described above, according to an embodiment of the present invention, when displaying a moving image on a screen, a motion blurring phenomenon where a residual image of a previous frame is displayed on a current frame can be prevented. Especially, an embodiment of the present invention has an advantage when applied to a scanning backlight driving method where a plurality of lamps are sequentially driven, as it controls the brightness of a backlight assembly to its maximum value, if an image displayed on a screen is a still picture, the picture quality of which is much influenced by the brightness of the backlight assembly but is not influenced by a motion picture response time MPRT. On the contrary, an embodiment of the present invention decreases the brightness of a backlight assembly so as to decrease the motion picture response time MPRT, if an image displayed on a screen is a motion picture the picture quality of which is more influenced by a motion picture response time MPRT than the brightness of a backlight assembly, thereby preventing a motion blurring phenomenon and increasing a picture quality.

It will be apparent to those skilled in the art that various modifications and variations can be made in the LCD device and driving method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a back light assembly that emits light on a liquid crystal panel;
a duty ratio controller that controls a duty ratio of a driving control signal according to the difference between video data of at least three frames that are sequentially inputted to the liquid crystal panel; and
an inverter that controls brightness of the light emitted from the back light assembly according to a difference between video data of at least three frames that are sequentially inputted to the liquid crystal panel,
wherein the inverter supplies a back light driving signal to the back light assembly to change the brightness of the light emitted from the back light assembly according to the duty ratio of the driving control signal,
wherein the duty ratio controller includes a comparing part that compares video data of at least three frames that are sequentially inputted to the liquid crystal panel and a duty ratio control signal generator to generate a duty ratio control signal having a duty ratio calculated in response to a comparison result of the comparing part, and a look up table that is set such that quantities of change of video data between at least three frames and duty ratios are corresponded to each other,
wherein the comparing part generates an image change detection signal indicating a change of an image between video data of at least three frames according to the comparison result and supplies the image change detection signal to the duty ratio control signal generator,
wherein the duty ratio control signal generator achieves the duty ratio corresponding to the comparison result from the look up table by the image change detection signal,
wherein the duty ratio control signal generator counts the number of changes between the two consecutive frames among the at least three sequentially inputted frames by the image change detection signal,
wherein the duty ratio control signal generator achieves the duty ratio corresponding to the counted number of changes that represents a quantity of change of video data from the look up table and supplies the achieved duty ratio to the inverter.

2. The liquid crystal display according to claim 1,
wherein when the inverter receives the duty ratio control signal together with the calculated duty ratio from the duty ratio controller, the inverter changes a duty ratio of the back light driving signal so that the back light driving signal gets the calculated duty ratio.

3. The liquid crystal display according to claim 1, wherein the duty ratio controller calculates a quantity of change of video data between at least three frames that are sequentially inputted, and determines whether an image displayed on the liquid crystal panel is a still picture or a motion picture according to the quantity of change of video data.

4. The liquid crystal display according to claim 1, wherein the duty ratio controller calculates a quantity of change of video data between at least three frames that are sequentially inputted, and determines whether an image displayed on the liquid crystal panel is a still picture or one of a plurality of types of motion pictures according to the quantity of change of video data.

5. The liquid crystal display according to claim 1, wherein the duty ratio controller compares video data between two neighboring frames pixel by pixel, and determines whether there is a change of video data between the two neighboring frames according to a quantity of pixel in which video data is changed.

6. The liquid crystal display according to claim 5, wherein the duty ratio controller compares video data between the two neighboring frames pixel by pixel for a portion of pixels among all the pixels within an effective display area of the liquid crystal panel.

7. The liquid crystal display according to claim 1, wherein the duty ratio controller changes the duty ratio of the driving control signal depending on a number of events when a quantity of change of video data between two neighboring frames is more than a predetermined reference value among at least three frames that are sequentially inputted.

8. The liquid crystal display according to claim 1, wherein the duty ratio controller compares a quantity of change of video data between two neighboring frames among at least three frames that are sequentially inputted, and changes the duty ratio of the driving control signal depending on a sum of each quantity of change of video data between the two neighboring frames.

9. The liquid crystal display according to claim 1, wherein the brightness of the light emitted from the back light assembly increases as the duty ratio of the driving control signal increases.

10. The liquid crystal display according to claim 1, wherein the back light assembly includes a plurality of lamps that are arranged in parallel with each other and sequentially turned on and off during one frame period.

11. A back light driving device for a liquid crystal display, comprising:
a duty ratio controller that controls a duty ratio of a driving control signal used for controlling the brightness of a back light assembly according to the difference between video data of at least three frames that are sequentially inputted to a liquid crystal panel; and
an inverter that supplies a back light driving signal to the back light assembly to change the brightness of the light emitted from the back light assembly according to the duty ratio of the driving control signal,
wherein the duty ratio controller includes a comparing part that compares video data of a plurality of frames that are sequentially inputted to the liquid crystal panel and a duty ratio control signal generator to generate a duty ratio control signal having a duty ratio calculated in response to a comparison result of the comparing part, and a look up table that is set such that quantities of change of video data between at least three frames and duty ratios are corresponded to each other,
wherein the comparing part generates an image change detection signal indicating a change of an image between video data of at least three frames according to the comparison result and supplies the image change detection signal to the duty ratio control signal generator,
wherein the duty ratio control signal generator achieves the duty ratio corresponding to the comparison result from the look up table by the image change detection signal,
wherein the duty ratio control signal generator counts the number of changes between the two consecutive frames among the at least three sequentially inputted frames by the image change detection signal,
wherein the duty ratio control signal generator achieves the duty ratio corresponding to the counted number of changes that represents a quantity of change of video data from the look up table and supplies the achieved duty ratio to the inverter.

12. The back light driving device for a liquid crystal display according to claim 11, wherein when the inverter receives the duty ratio control signal together with the calculated duty ratio from the duty ratio controller, the inverter changes a duty ratio of the back light driving signal so that the back light driving signal gets the calculated duty ratio.

13. The back light driving device for a liquid crystal display according to claim 11, wherein the brightness of the light emitted from the back light assembly increases as the duty ratio of the driving control signal increases.

14. A driving method of a liquid crystal display, comprising:
delaying a video data of at least one frame for a predetermined time;
comparing video data between at least three frames that are sequentially inputted to a liquid crystal panel;
generating an image change detection signal indicating a change of an image between video data of at least three frames according to the comparison result;
achieving a duty ratio corresponding to the comparison result from a look up table by the image change detection signal;
controlling brightness of light emitted from a back light assembly according to a difference between video data of the at least three frames that are sequentially inputted to the liquid crystal panel; and
supplying a back light driving signal to the back light assembly to change the brightness of the light emitted from the back light assembly according to the duty ratio of the driving control signal,
wherein the look up table is set such that quantities of change of video data between at least three frames and duty ratios are corresponded to each other,
wherein the comparing part generates an image change detection signal indicating a change of an image between video data of at least three frames according to the comparison result and supplies the image change detection signal to the duty ratio control signal generator,
wherein the duty ratio control signal generator achieves the duty ratio corresponding to the comparison result from the look up table by the image change detection signal,
wherein the duty ratio control signal generator counts the number of changes between the two consecutive frames among the at least three sequentially inputted frames by the image change detection signal, and
wherein the duty ratio control signal generator achieves the duty ratio corresponding to the counted number of changes that represents a quantity of change of video data from the look up table and supplies the achieved duty ratio to the inverter.

15. The driving method of a liquid crystal display according to claim 14, wherein the comparing the video data includes:
controlling a duty ratio of a driving control signal according to the difference between video data of at least three frames that are sequentially inputted to the liquid crystal panel.

16. The driving method of a liquid crystal display according to claim 14, wherein the comparing the video data includes:
calculating a quantity of change of video data between at least three frames that are sequentially inputted; and
determining whether an image displayed on the liquid crystal panel is a still picture or a motion picture according to the quantity of change of video data.

17. The driving method of a liquid crystal display according to claim 14, wherein the comparing the video data includes:
calculating a quantity of change of video data between at least three frames that are sequentially inputted; and
determining whether an image displayed on the liquid crystal panel is a still picture or one of a plurality of types of motion pictures according to the quantity of change of video data.

18. The driving method of a liquid crystal display according to claim 14, wherein the comparing the video data includes:
comparing video data between two neighboring frames pixel by pixel; and
determining whether there is a change of video data between the two neighboring frames according to a quantity of pixel in which video data is changed.

19. The driving method of a liquid crystal display according to claim 18, wherein the video data between the two neighboring frames are compared pixel by pixel for a portion of pixels among all the pixels within an effective display area of the liquid crystal panel.

20. The driving method of a liquid crystal display according to claim 14, wherein the comparing the video data includes:
changing a duty ratio of a driving control signal depending on a number of events when a quantity of change of video data between two neighboring frames is more than a predetermined reference value among at least three frames that are sequentially inputted; and
wherein the brightness of light emitted from the back light assembly is changed according to the duty ratio of the driving control signal.

21. The driving method of a liquid crystal display according to claim 14, wherein the comparing the video data includes:
comparing a quantity of change of video data between two neighboring frames among at least three frames that are sequentially inputted;
changing a duty ratio of a driving control signal depending on a sum of each quantity of change of video data between the two neighboring frames; and
wherein the brightness of light emitted from the back light assembly is changed according to the duty ratio of the driving control signal.

22. The driving method of a liquid crystal display according to claim 14, wherein the brightness of the light emitted from the back light assembly increases as the duty ratio of the driving control signal increases.

23. The liquid crystal display according to claim 14, wherein the back light assembly includes a plurality of lamps that are arranged in parallel with each other and sequentially turned on and off during one frame period.

* * * * *